United States Patent
Ohkura

(10) Patent No.: US 8,994,300 B2
(45) Date of Patent: Mar. 31, 2015

(54) BATTERY MODULE, AND ELECTRIC VEHICLE, MOVABLE BODY, BATTERY SYSTEM, POWER STORAGE DEVICE, AND POWER SUPPLY DEVICE INCLUDING THE SAME

(75) Inventor: Kazumi Ohkura, Nara (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 330 days.

(21) Appl. No.: 13/521,850

(22) PCT Filed: Jan. 20, 2011

(86) PCT No.: PCT/JP2011/000293
§ 371 (c)(1),
(2), (4) Date: Jul. 12, 2012

(87) PCT Pub. No.: WO2011/089910
PCT Pub. Date: Jul. 28, 2011

(65) Prior Publication Data
US 2012/0286706 A1    Nov. 15, 2012

(30) Foreign Application Priority Data
Jan. 20, 2010   (JP) ................. 2010-010122

(51) Int. Cl.
*H02P 1/00*  (2006.01)
*H01M 2/10*  (2006.01)
*B60L 3/00*  (2006.01)
*B60L 11/18* (2006.01)
*H01M 10/625* (2014.01)
*H01M 10/658* (2014.01)
*B60L 7/14*  (2006.01)
*B60L 15/20* (2006.01)

(52) U.S. Cl.
CPC .......... *H01M 2/1077* (2013.01); *B60L 3/0007* (2013.01); *B60L 11/1879* (2013.01); *H01M 2/1083* (2013.01); *H01M 2/1094* (2013.01); *H01M 10/5016* (2013.01); *H01M 10/5087* (2013.01); *B60L 3/0046* (2013.01); *B60L 7/14* (2013.01); *B60L 11/1803* (2013.01); *B60L 11/1864* (2013.01); *B60L 11/1874* (2013.01); *B60L 15/2009* (2013.01); *Y02T 10/7005* (2013.01); *B60L 2210/10* (2013.01); *B60L 2240/421* (2013.01); *B60L 2240/423* (2013.01); *B60L 2250/26* (2013.01); *Y02T 10/7061* (2013.01); *Y02T 10/7216* (2013.01); *Y02T 10/642* (2013.01)
USPC ......................................................... 318/139

(58) Field of Classification Search
CPC .......... H01M 2/1077; H01M 10/0525; H01M 10/5004; Y02T 10/7005; Y02T 10/7077; Y02T 10/70; B60W 10/08; B60W 20/00
See application file for complete search history.

(56) References Cited

U.S. PATENT DOCUMENTS

| | | | |
|---|---|---|---|
| 2006/0091855 A1 | 5/2006 | Seo | |
| 2006/0115720 A1* | 6/2006 | Kim | 429/156 |
| 2006/0204840 A1 | 9/2006 | Jeon et al. | |
| 2006/0214641 A1 | 9/2006 | Cho | |
| 2008/0063929 A1 | 3/2008 | Byun et al. | |
| 2009/0111010 A1 | 4/2009 | Okada et al. | |
| 2009/0267556 A1* | 10/2009 | Koike | 318/434 |

FOREIGN PATENT DOCUMENTS

| | | |
|---|---|---|
| JP | 2005-347077 A | 12/2005 |
| JP | 2006-128116 A | 5/2006 |
| JP | 2006-156406 A | 6/2006 |
| JP | 2006-253149 A | 9/2006 |
| JP | 2006-278330 A | 10/2006 |
| JP | 2007-200778 A | 8/2007 |
| JP | 2008-071733 A | 3/2008 |
| JP | 2008-159439 A | 7/2008 |
| JP | 2009-110833 A | 5/2009 |
| JP | 2009-259455 A | 11/2009 |

* cited by examiner

*Primary Examiner* — Shawki S Ismail
*Assistant Examiner* — Zoheb Imtiaz
(74) *Attorney, Agent, or Firm* — Marvin A. Motsenbocker; Mots Law, PLLC

(57) ABSTRACT

A plate-shaped portion of each of separators has a cross-sectional shape bent in a concavo-convex shape in a vertical direction. The plate-shaped portion of each of the separators has a flat cross-sectional shape. The plurality of separators are arranged parallel to one another to alternately line up. One surface of each of the battery cells abuts on the plate-shaped portion of the separator, and the other surface abuts on the plate-shaped portion of the separator. Thus, a spacing between the battery cells, which are adjacent to each other with the separator sandwiched therebetween, becomes equal to the thickness of the plate-shaped portion, and a spacing between the battery cells, which are adjacent to each other with the separator sandwiched therebetween, becomes equal to the thickness of the plate-shaped portion.

11 Claims, 21 Drawing Sheets

FIG. 4
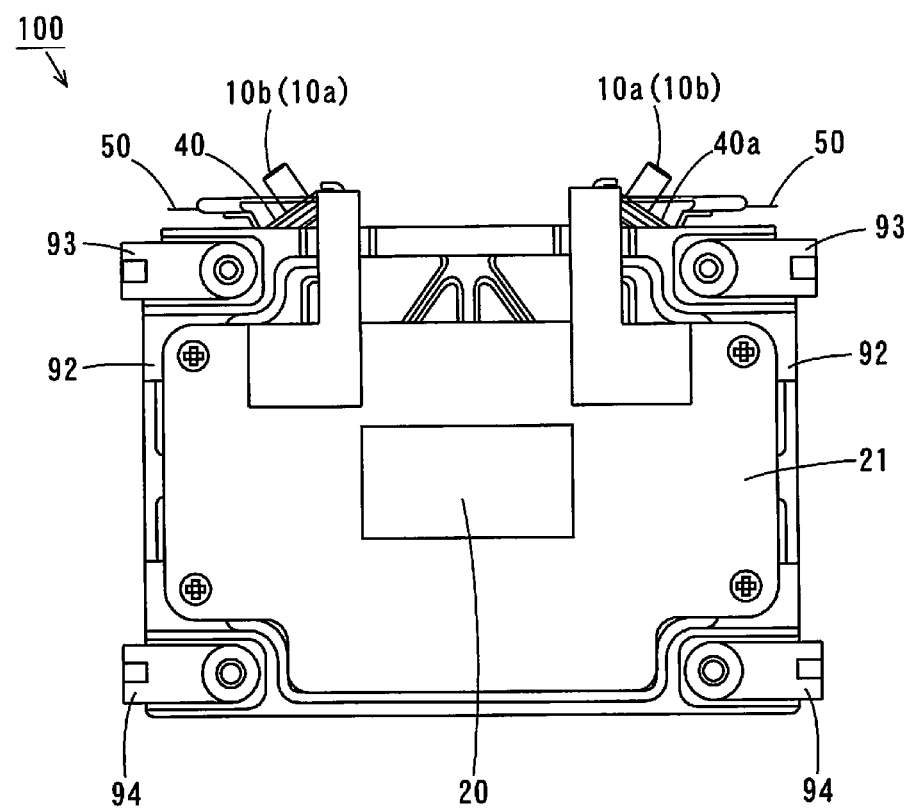
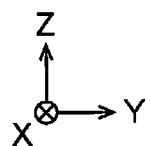

F I G. 1 1
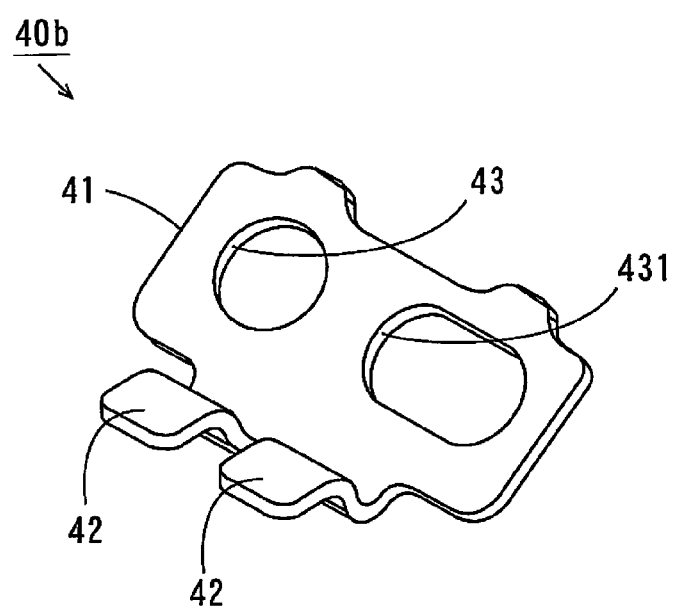

BATTERY MODULE, AND ELECTRIC VEHICLE, MOVABLE BODY, BATTERY SYSTEM, POWER STORAGE DEVICE, AND POWER SUPPLY DEVICE INCLUDING THE SAME

TECHNICAL FIELD

The present invention relates to a battery module, and an electric vehicle, a movable body, a battery system, a power storage device, and a power supply device including the same.

BACKGROUND ART

Conventionally, in movable bodies such as electric automobiles using electric power as driving sources, battery modules including a plurality of battery cells connected in series or in parallel have been used.

A separator for ensuring a predetermined gap is arranged between the adjacent battery cells in the battery module (e.g., Patent Document 1). Each of the battery cells can be efficiently cooled by causing cooling gas to flow into the gap ensured by the separator.

[Patent Document 1] JP 2006-156406 A

SUMMARY OF INVENTION

Technical Problem

However, the separator is arranged so that the battery module is increased in size. On the other hand, when the separator is not arranged, each of the battery cells cannot be sufficiently cooled.

An object of the present invention is to provide a battery module, and an electric vehicle, a movable body, a battery system, a power storage device, and a power supply device including the same capable of sufficiently cooling each of battery cells and capable of being miniaturized.

Solution to Problem (1) According to an aspect of the present invention, a battery module includes a plurality of three or more battery cells that are stacked at spacings, and a spacing keeping member that keeps the spacing between the adjacent battery cells, in which the spacing keeping member keeps one of the odd-numbered spacing and the even-numbered spacing from one end side of the plurality of battery cells larger than the other spacing.

In the battery module, the spacing keeping member keeps one of the odd-numbered spacing and the even-numbered spacing from the one end side of the plurality of battery cells larger than the other spacing.

In this case, a spacing between one surface of each of the battery cells and another adjacent battery cell is kept larger than a spacing between the other surface of each of the battery cells and a still another adjacent battery cell. Therefore, a gap through which cooling gas can pass can be formed between the one surface of each of the battery cells and the other adjacent battery cell. Thus, each of the battery cells can be sufficiently cooled. The spacing between the other surface of each of the battery cells and the other adjacent battery cell can be kept small so that the battery module can be miniaturized.

(2) The spacing keeping member may include a plurality of separators that are each arranged between the adjacent battery cells and each keep the spacing between the adjacent battery cells, the plurality of separators may include one or a plurality of first separators that each keep one of the even-numbered spacing and the odd-numbered spacing, and one or a plurality of second separators that each keep the other of the even-numbered spacing and the odd-numbered spacing.

In this case, one of the odd-numbered spacing and the even-numbered spacing from the one end side of the plurality of battery cells can be kept larger than the other spacing in a simple configuration. Thus, each of the battery cells can be sufficiently cooled easily at low cost, and the battery module can be miniaturized.

(3) The one or plurality of first separators may each form the spacing through which cooling gas can pass between the adjacent battery cells.

In this case, the gap through which the cooling gas can pass is formed between the one surface of each of the battery cells and the other adjacent battery cell. Thus, each of the battery cells can be sufficiently cooled.

(4) The one or plurality of first separators may have lower thermal insulation properties than the one or plurality of second separators.

In this case, heat generated by each of the battery cells easily moves to the cooling gas through the first separator. Thus, each of the battery cells is efficiently cooled.

(5) The battery module may further include a connection member that electrically connects electrodes of the adjacent battery cells, in which the connection member may include first and second holes into which the electrodes of the adjacent battery cells are respectively inserted, and at least one of the first and second holes may be provided to extend in a stacked direction of the plurality of battery cells.

In this case, the electrodes of the adjacent battery cells are respectively inserted into the first and second holes in the connection member so that the electrodes of the adjacent battery cells are electrically connected to each other.

At least one of the first and second holes in the connection member is provided to extend in the stacked direction of the plurality of battery cells so that the electrodes of the battery cells are arranged at any positions in the hole. Therefore, even if there is a variation among distances between the electrodes of the adjacent battery cells, the electrodes of the adjacent battery cells can be electrically connected to each other using the common connection member.

(6) The battery module may further include a connection member that electrically connects the electrodes of the adjacent battery cells, in which the connection member may include first and second holes into which the electrodes of the adjacent battery cells are respectively inserted, and the position of the electrode of each of the battery cells may be set so that distances between the electrodes of the adjacent battery cells are equal.

In this case, the electrodes of the adjacent battery cells are respectively inserted into the first and second holes in the connection member so that the electrodes of the adjacent battery cells are electrically connected to each other.

The position of the electrode of each of the battery cells is set such that the distances between the adjacent battery cells are equal. Thus, the electrodes of the adjacent battery cells can be electrically connected to each other using the common connection member that is equal in the distance between the first and second holes.

(7) According to another aspect of the present invention, an electric vehicle includes the above-mentioned battery module, a motor that is driven with electric power from the battery module, and a drive wheel that rotates with a torque generated by the motor.

In the electric vehicle, the motor is driven with the electric power from the battery module. The drive wheel rotates with the torque generated by the motor so that the electric vehicle moves.

In this case, the above-mentioned battery module is used so that each of the battery cells can be sufficiently cooled, and the battery module can be miniaturized. Thus, the traveling performance of the electric vehicle is improved, and the electric vehicle can be miniaturized.

(8) According to still another aspect of the present invention, a movable body includes the above-mentioned battery module, a main movable body, and a power source that receives electric power from the battery module, and converts the electric power into drive power for moving the main movable body.

In the movable body, the power source converts the electric power from the battery module into the drive power, and the main movable body moves with the drive power. In this case, the above-mentioned battery module is used so that each of the battery cells can be sufficiently cooled, and the battery module can be miniaturized. Thus, the traveling performance of the movable body is improved, and the movable body can be miniaturized.

(9) According to yet still another aspect of the present invention, a battery system includes the above-mentioned plurality of battery modules.

In the battery system, the above-mentioned battery modules are used so that each of the battery cells can be sufficiently cooled, and the battery module can be miniaturized. As a result, the battery system can be miniaturized.

(10) According to a further aspect of the present invention, a power storage device includes the above-mentioned battery system, and a controller that performs at least one of determination whether discharge of the plurality of battery modules is stopped at the time of the discharge of the plurality of battery modules and determination whether charge of the plurality of battery modules is stopped at the time of the charge of the plurality of battery modules based on charged capacities of the plurality of battery modules in the battery system.

In the power storage device, based on the charged capacity of the plurality of battery modules, the controller performs at least one of the determination whether the discharge of the plurality of battery modules is stopped at the time of the discharge of the plurality of battery modules and the determination whether the charge of the plurality of battery modules is stopped at the time of the charge of the plurality of battery modules. Thus, the plurality of battery modules can be prevented from being overdischarged and overcharged.

In this case, the above-mentioned battery modules are used so that each of the battery cells can be sufficiently cooled, and the battery module can be miniaturized. As a result, the power storage device can be miniaturized.

(11) According to a still further aspect of the present invention, a power supply device that is connectable to an external object includes the above-mentioned power storage device, and a power conversion device that converts electric power between the plurality of battery modules in the power storage device and the external object, in which the controller controls the supply of electric power between the power conversion device and the external object based on a result of the determination whether the discharge or charge of the plurality of battery modules is stopped.

In the power supply device, the power conversion device converts the electric power between the plurality of battery modules and the external object. When the plurality of battery modules are charged and discharged, the controller controls the supply of the electric power between the power conversion device and the external object based on the result of the determination whether the discharge or the charge of the plurality of battery modules is stopped. Thus, the plurality of battery modules can be prevented from being overdischarged and overcharged.

In this case, the above-mentioned battery modules are used so that each of the battery cells can be sufficiently cooled, and the battery module can be miniaturized. As a result, the power supply device can be miniaturized.

Advantageous Effects of Invention

According to the present invention, each of the battery cells can be sufficiently cooled, and the battery module can be miniaturized.

BRIEF DESCRIPTION OF DRAWINGS

FIG. 4 is a side view of the battery module.

FIG. 11 is an external perspective view illustrating another example of a bus bar.

DESCRIPTION OF EMBODIMENTS

A battery system including a battery module according to an embodiment of the present invention will be described with reference to the drawings. The battery system described below is mounted on an electric vehicle (e.g., an electric automobile) using electric power as a driving source.

(1) Configuration of Battery System

Figure 1:
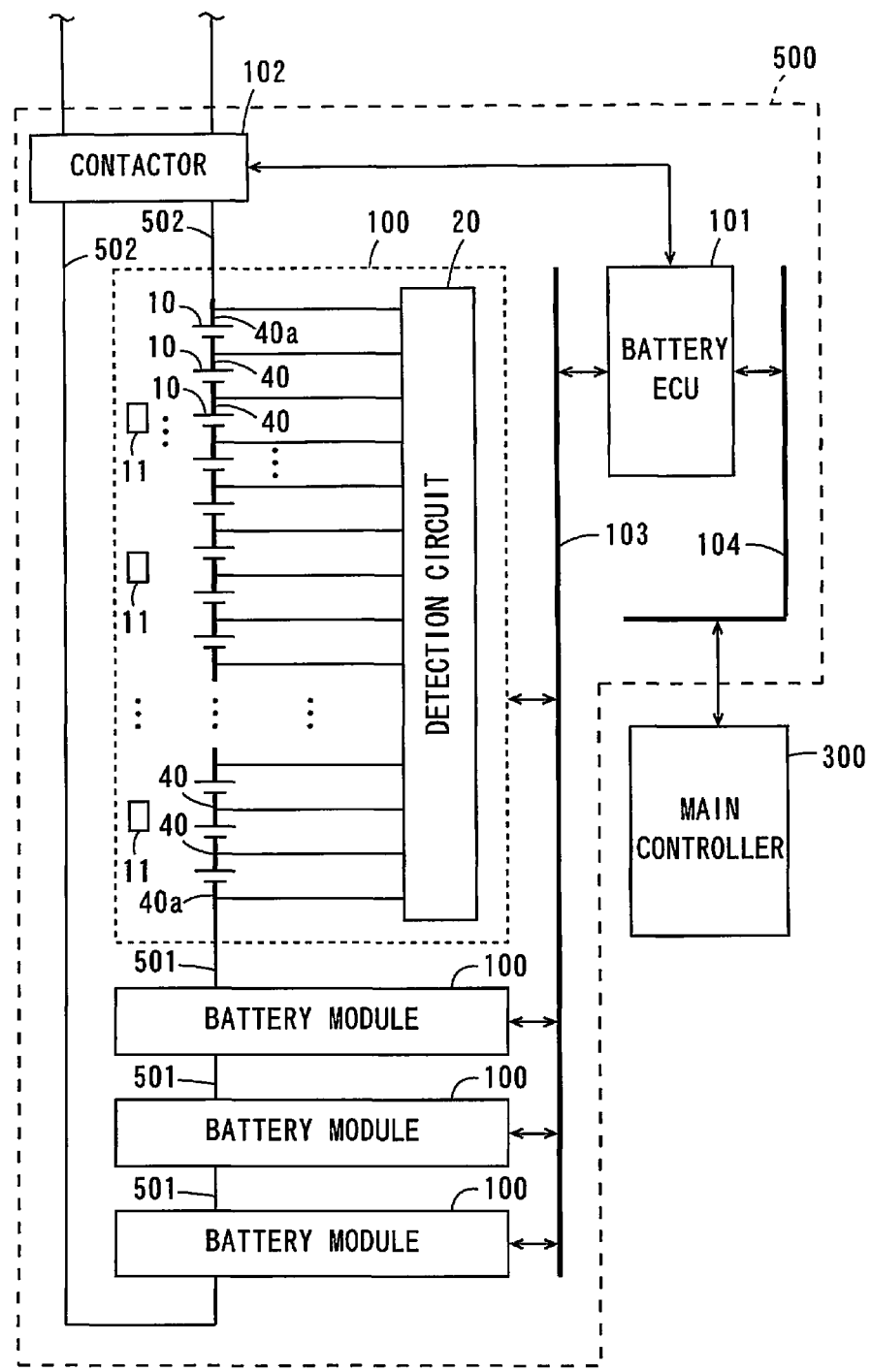
FIG. 1 is a block diagram illustrating a configuration of a battery system.

FIG. 1 is a block diagram illustrating a configuration of a battery system including a battery module according to the present embodiment. As illustrated in FIG. 1, a battery system 500 includes a plurality of (four in this example) battery modules 100, a battery ECU (Electronic Control Unit) 101, and a contactor 102, and is connected to a main controller 300 in an electric vehicle via a bus 104.

The plurality of battery modules 100 in the battery system 500 are connected to one another via a connecting conductor 501. Power supply lines 502 are respectively connected to the battery modules 100 at both ends. Each of the battery modules 100 includes a plurality of (e.g., eighteen) battery cells 10, a plurality of (e.g., five) thermistors 11, and a detection circuit 20.

In each of the battery modules 100, the stacked plurality of battery cells 10 are connected in series via the plurality of bus bars 40. Each of the battery cells 10 is a secondary battery such as a lithium-ion battery or a nickel hydride battery.

The battery cells 10 arranged at both the ends are connected to the connecting conductor 501 or the power supply line 502, respectively, via bus bars 40a. Thus, all the battery cells 10 in the plurality of battery modules 100 are connected in series in the battery system 500. The power supply line 502 is connected to a load such as a motor of the electric vehicle.

The detection circuit 20 is electrically connected to each of the bus bars 40, 40a. The detection circuit 20 is electrically connected to each of the thermistors 11. The detection circuit 20 detects a terminal voltage and a temperature of each of the battery cells 10 and a current flowing through each of the bus bars 40, 40a. Details of the battery module 100 will be described below.

The detection circuit 20 in each of the battery modules 100 is connected to the battery ECU 101 via a bus 103. Thus, the voltage, the current, and the temperature, which have been detected by the detection circuit 20, are given to the battery ECU 101.

The battery ECU 101 calculates a charged capacity of each of the battery cells 10 in each of the battery modules 100 based on the voltage, the current, and the temperature, which have been given from each of detection circuit 20, for example, and controls charge and discharge of the battery module 100 based on the charged capacity. The battery ECU 101 detects an abnormality in each of the battery modules 100 based on the voltage, the current, and the temperature given from each of the detection circuits 20. The abnormality in the battery module 100 includes overdischarge, overcharge, or an abnormal temperature of the battery cell 10, for example.

The contactor 102 is inserted in the power supply line 502 connected to the battery modules 100 at both the ends. The battery ECU 101 turns off, when it has detected the abnormality in the battery module 100, the contactor 102. Since no current flows through each of the battery modules 100 when the abnormality occurs, the battery module 100 is prevented from being abnormally heated.

The battery ECU 101 is connected to the main controller 300 via the bus 104. The charged capacity of each of the battery modules 100 (the charged capacities of the battery cells 10) is given from the battery ECU 101 to the main controller 300. The main controller 300 controls power of the electric vehicle (e.g., a rotational speed of the motor) based on the charged capacity.

(2) Details of Battery Module

Figure 2:
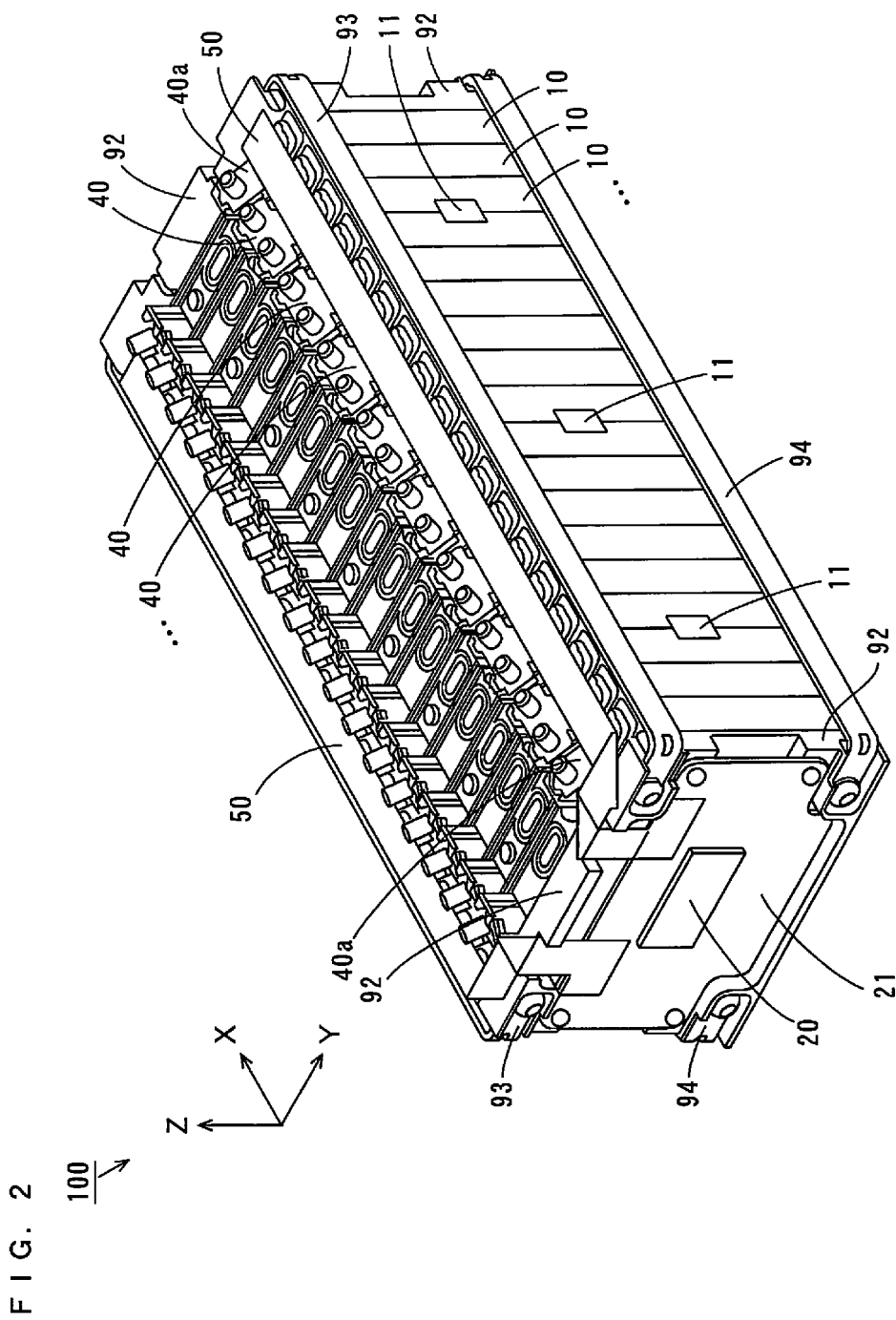
FIG. 2 is an external perspective view of a battery module.

Details of the battery module 100 will be described. FIG. 2 is an external perspective view of the battery module 100, FIG. 3 is a plan view of the battery module 100, and FIG. 4 is a side view of the battery module 100.

In FIGS. 2 to 4, and FIGS. 5 to 7, FIG. 9, FIG. 12, and FIG. 14, described below, three directions that are perpendicular to one another are defined as an X-direction, a Y-direction, and a Z-direction, as indicated by arrows X, Y, Z, respectively. In this example, the X-direction and the Y-direction are parallel to a horizontal plane, and the Z-direction is perpendicular to the horizontal plane.

Figure 3:
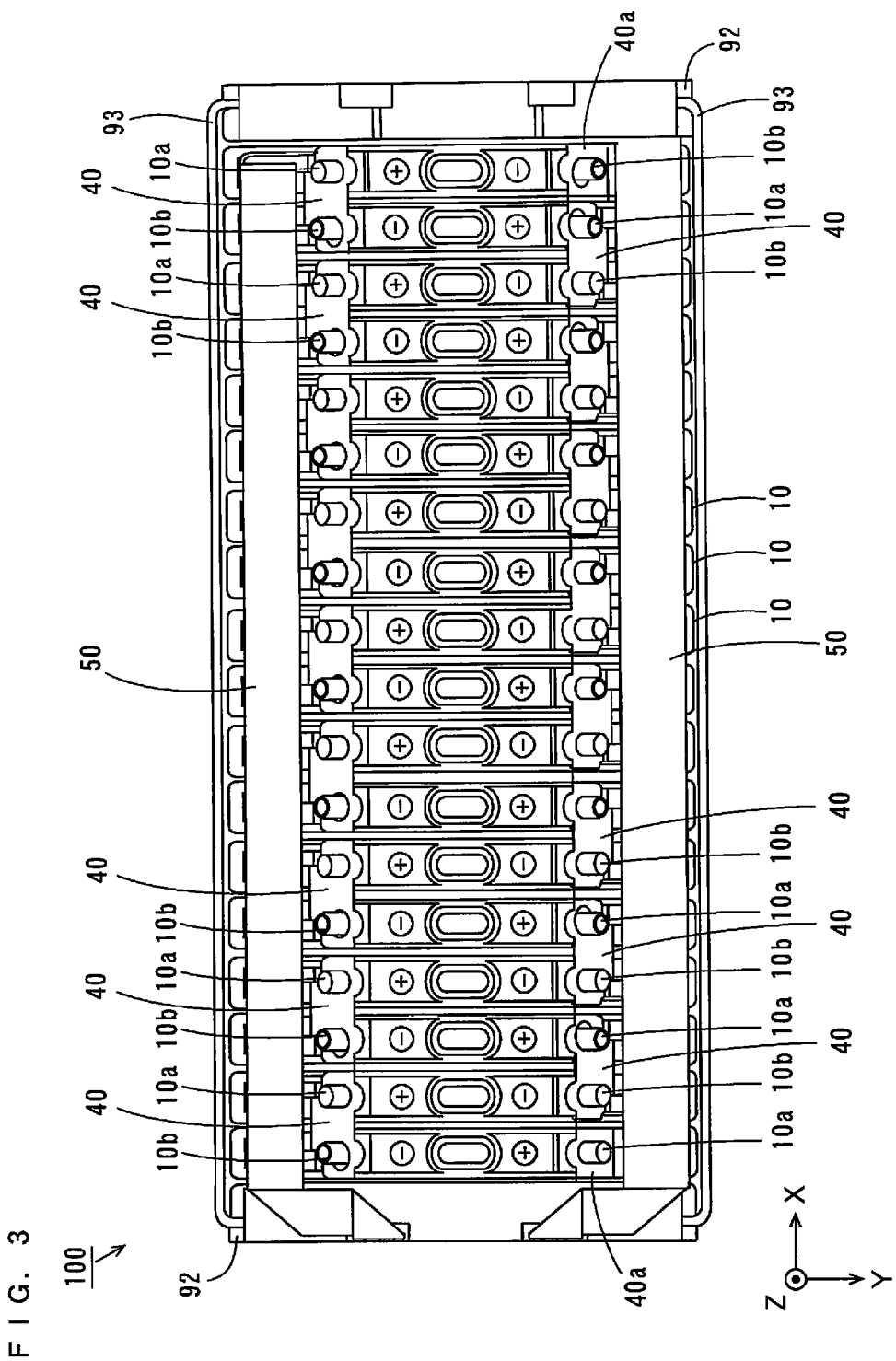
FIG. 3 is a plan view of the battery module.

As illustrated in FIGS. 2 to 4, the plurality of battery cells 10 each having a flat and substantially rectangular parallelepiped shape are stacked in the X-direction in the battery module 100. In the present embodiment, separators are arranged between the adjacent battery cells 10. Details of the separator will be described below.

The plurality of battery cells 10 are integrally fixed by a pair of end plates 92, a pair of upper end frames 93, and a pair of lower end frames 94. The pair of end plates 92 has a substantially plate shape, and is arranged parallel to a YZ plane. The pair of upper end frames 93 and the pair of lower end frames 94 are arranged to extend in the X-direction.

Connectors for connecting the pair of upper end frames 93 and the pair of lower end frames 94 are formed at four corners of the pair of end plates 92. The pair of upper end frames 93 is attached to the upper connectors of the pair of end plates 92, and the pair of lower end frames 94 is attached to the lower connectors of the pair of end plates 92 with the plurality of battery cells 10 arranged between the pair of end plates 92. Thus, the plurality of battery cells 10 are integrally fixed while being arranged to line up in the X-direction.

A rigid printed circuit board (hereinafter referred to as a printed circuit board) 21 is attached to the one end plate 92 on its outer surface at a spacing. The detection circuit 20 is provided on the printed circuit board 21.

The plurality of battery cells 10 each have a plus electrode 10a and a minus electrode 10b on its upper surface portion on each of the one end side and the other end side in the Y-direction and its upper surface portion on the opposite end side, respectively. Each of the electrodes 10a, 10b is provided at an angle to protrude upward (see FIG. 4).

In the following description, the battery cell 10 adjacent to the end plate 92 to which the printed circuit board 21 is not attached to the battery cell 10 adjacent to the end plate 92 to which the printed circuit board 21 is attached are respectively referred to as a first battery cell 10 to an 18th battery cell 10.

In the battery module 100, the battery cells 10 are arranged so that a positional relationship between the plus electrode 10a and the minus electrode 10b in the Y-direction in one of the adjacent battery cells 10 is opposite to that in the other battery cell 10, as illustrated in FIG. 3.

Thus, in the adjacent battery cells 10, the plus electrode 10a of the one battery cell 10 is in close proximity to the minus electrode 10b of the other battery cell 10, and the minus electrode 10b of the one battery cell 10 is in close proximity to the plus electrode 10a of the other battery cell 10. In this state, the bus bar 40 is attached to the two electrodes being in close proximity to each other. Thus, the plurality of battery cells 10 are connected in series.

More specifically, the common bus bar 40 is attached to the plus electrode 10a of the first battery cell 10 and the minus electrode 10b of the second battery cell 10. The common bus bar 40 is attached to the plus electrode 10a of the second battery cell 10 and the minus electrode 10b of the third battery cell 10. Similarly, the common bus bar 40 is attached to the plus electrode 10a of each of the odd numbered battery cells 10 and the minus electrode 10b of each of the even numbered battery cells 10 adjacent thereto. The common bus bar 40 is attached to the plus electrode 10a of each of the even numbered battery cells 10 and the minus electrode 10b of each of the odd numbered battery cells 10 adjacent thereto.

The bus bar 40a for connecting the connecting conductor 501 or the power supply line 502 from an external object is attached to each of the minus electrode 10b of the first battery cell 10 and the plus electrode 10a of the 18th battery cell 10.

A long-sized flexible printed circuit board (hereinafter abbreviated as an FPC board) 50 extending in the X-direction is connected in common to the plurality of bus bars 40, 40a on the one end side of the plurality of battery cells 10 in the Y-direction. Similarly, a long-sized FPC board 50 extending in the X-direction is connected in common to the plurality of bus bars 40 on the other end side of the plurality of battery cells 10 in the Y-direction.

The FPC board 50 has a configuration in which a plurality of conductor lines (wiring traces) are formed on an insulating layer, and has bendability and flexibility. Examples of a material for the insulating layer constituting the FPC board 50 include polyimide, and example of a material for the conductor lines include copper.

Each of the FPC boards 50 is bent inward at a right angle and further bent downward at an upper end portion of the end plate 92 (the end plate 92 to which the printed circuit board 21 is attached), and is connected to the printed circuit board 21.

(3) Separator

Separators are arranged between the adjacent battery cells 10, as described above. In the present embodiment, two types of separators S1, S2, described below, are used. Details of the separators S1, S2 will be described below.

Figure 5:
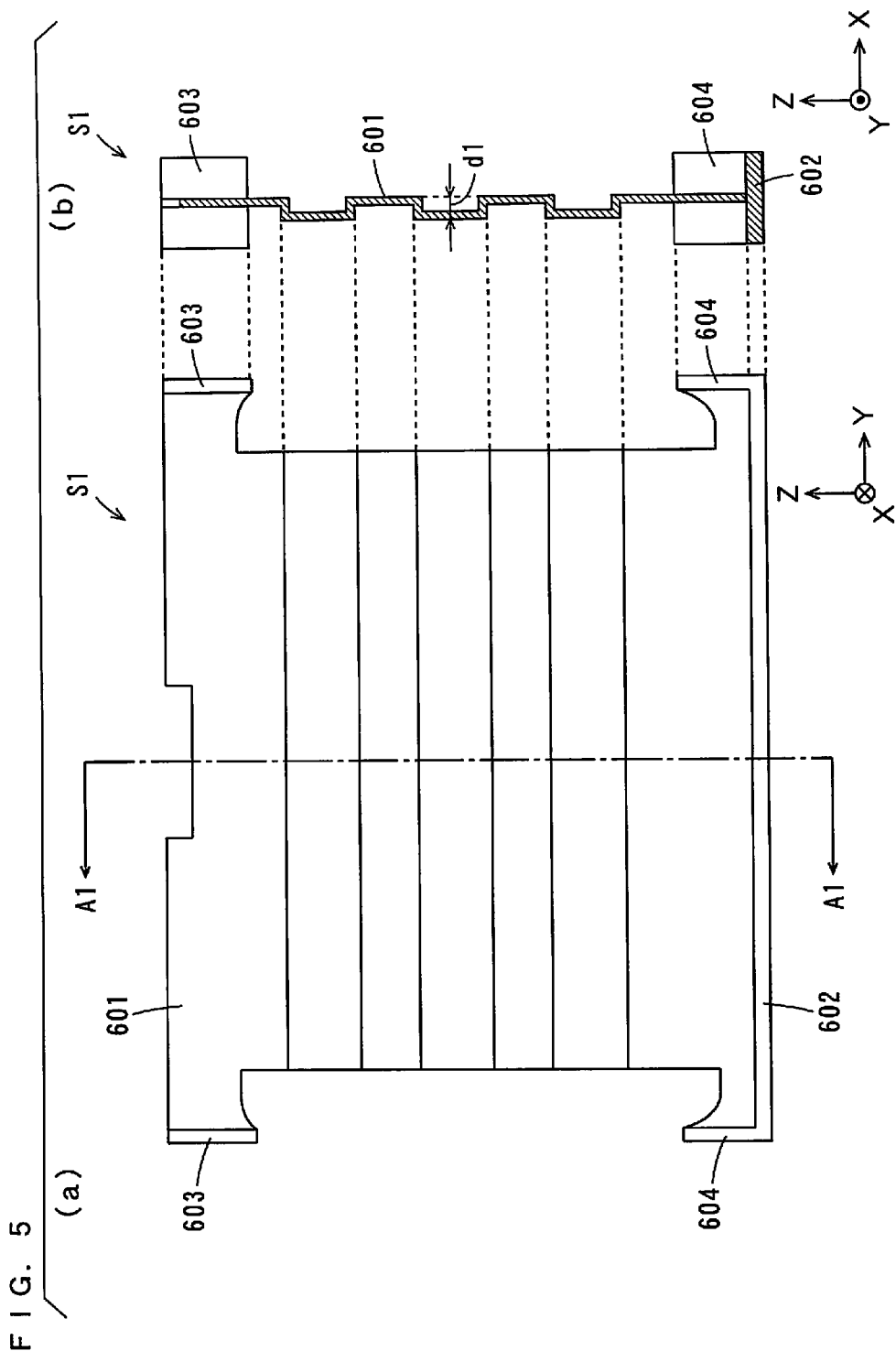
FIG. 5 is a schematic side view and a schematic sectional view illustrating details a separator.
Figure 6:
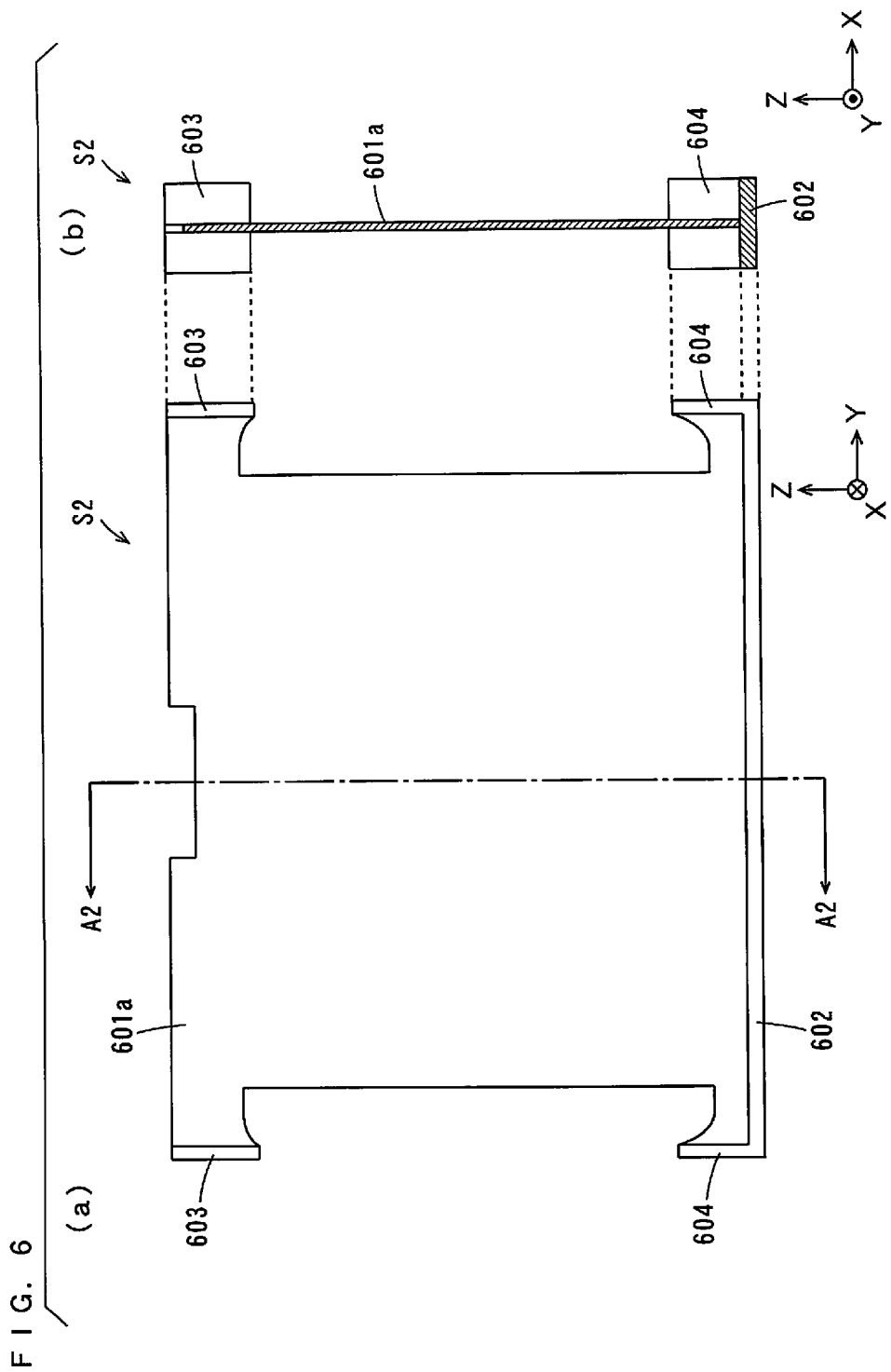
FIG. 6 is a schematic side view and a schematic sectional view illustrating details of a separator.

FIG. 5 is a schematic side view and a schematic sectional view illustrating details of the separator S1, and FIG. 6 is a schematic side view and a schematic sectional view illustrating details of the separator S2. A cross section taken along a line A1-A1 in FIG. 5 (a) is illustrated in FIG. 5 (b), and a cross section taken along a line A2-A2 in FIG. 6 (a) is illustrated in FIG. 6 (b).

As illustrated in FIG. 5, the separator S1 includes a substantially rectangular plate-shaped portion 601. The plate-shaped portion 601 has a cross-sectional shape bent in a concavo-convex shape in a vertical direction. A long-sized bottom surface portion 602 is provided to horizontally protrude toward one surface and the other surface of the plate-shaped portion 601 from a lower end of the plate-shaped portion 601. A pair of upper side surface portions 603 and a pair of lower side surface portions 604 are provided to protrude toward one surface and the other surface of the plate-shaped portion 601 from both sides of the plate-shaped portion 601. The upper surface portion 603 is provided to extend downward by a predetermined length from an upper end of the plate-shaped portion 601. The lower side surface portion 604 is connected to both ends of the bottom surface portion 602, and is provided to extend upward by a predetermined length from a lower end of the plate-shaped portion 602.

As illustrated in FIG. 6, the separator S2 has a similar configuration to that of the separator S1 illustrated in FIG. 5 except that it has a flat plate-shaped portion 601a instead of the plate-shaped portion 601 bent in a concavo-convex shape.

Figure 7:
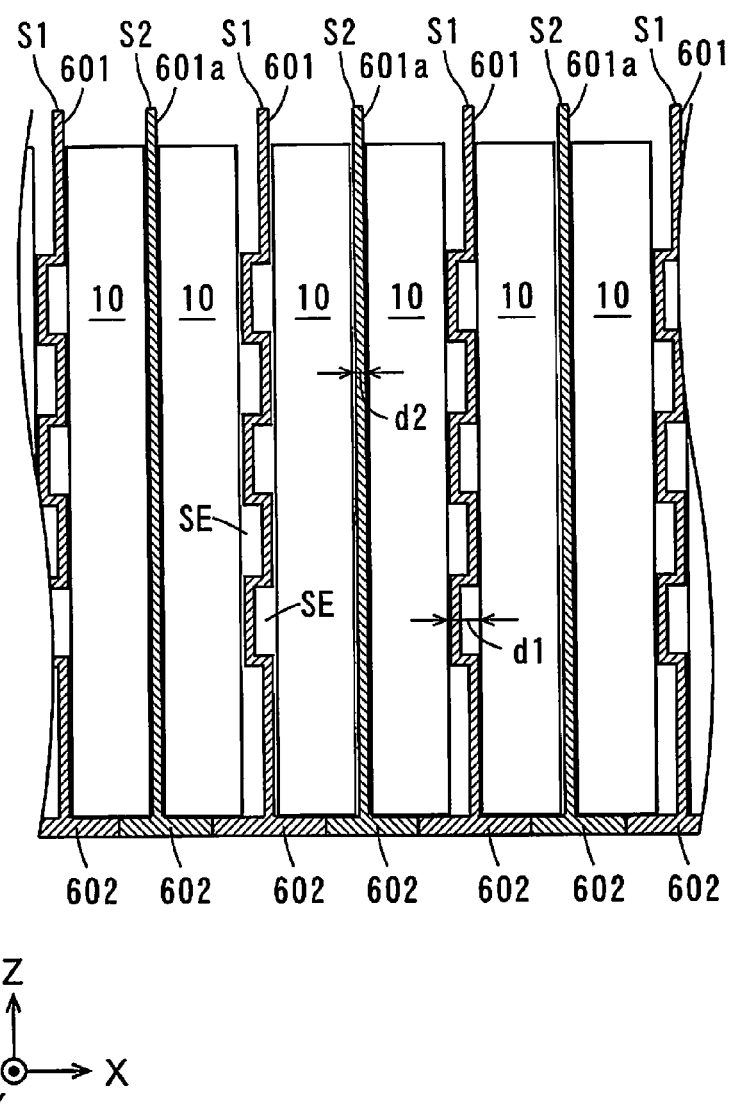
FIG. 7 is a schematic sectional view illustrating a state where separators are respectively arranged among a plurality of battery cells.

FIG. 7 is a schematic sectional view illustrating a state where the separators S1, S2 are respectively arranged between the plurality of battery cells 10. As illustrated in FIG. 7, the plurality of separators S1, S2 are arranged parallel to each other to alternately line up. The separator S1 or the separator S2 may be arranged between the first battery cell 10 and the one end plate 92 and between the 18th battery cell 10 and the other end plate 92.

In this case, the bottom surface portions 602, the upper side surface portions 603 (FIGS. 5 and 6), and the lower side surface portions 604 (FIGS. 5 and 6) in the adjacent separators S1, S2 abut on one another. In the state, the battery cell 10 is housed between the plate-shaped portions 601, 601a in the adjacent separators S1, S2.

The distance between the plate-shaped portions 601, 601a in the adjacent separators S1, S2 is kept substantially equal to the thickness in the X-direction of each of the battery cells 10. Therefore, one surface of each of the battery cells 10 abuts on the plate-shaped portion 601 in the separator S1, and the other surface thereof abuts on the plate-shaped portion 601a in the separator S2. Thus, a spacing between the battery cells 10 that are adjacent to each other with the separator S1 sandwiched therebetween becomes equal to the thickness (the size of an irregularity) d1 of the plate-shaped portion 601, and a spacing between the battery cells 10 that are adjacent to each other with the separator S2 sandwiched therebetween becomes equal to the thickness d2 of the plate-shaped portion 601a.

More specifically, the separator S1 keeps one of the odd-numbered spacing and the even-numbered spacing from one end side of the plurality of battery cells 10, and the separator S2 keeps the other spacing. For example, a spacing between the n-th (n is an even number) battery cell 10 and the (n+1)-th battery cell 10 corresponds to the even-numbered spacing. The separator S1 keeps the even-numbered spacing. A spacing between the m-th (m is an odd number) battery cell 10 and the (m+1)-th battery cell 10 corresponds to the odd-numbered spacing. The separator S2 keeps the odd-numbered spacing.

A gap SE corresponding to the irregularity of the plate-shaped portion 601 is formed between the battery cells 10 that are adjacent to each other with the separator S1 sandwiched therebetween.

More specifically, the gap SE is formed on one surface of each of the battery cells 10. Gas for cooling each of the battery cells 10 (hereinafter referred to as cooling gas) is supplied to the gap SE. Thus, the cooling gas contacts the one surface of each of the battery cells 10. Therefore, each of the battery cells 10 is efficiently cooled.

Examples of materials for the separators S1, S2 include a material having high thermal insulation properties. In this case, heat transfer between the adjacent battery cells 10 is suppressed so that chained heat generation between the adjacent battery cells 10 is prevented. The material for the separator S1 may include a material having lower thermal insulation properties than the material for the separator S2. In this case, heat generated by each of the battery cells 10 easily moves to the cooling gas supplied to the gap SE. Thus, the cooling efficiency of each of the battery cells 10 is further improved. More specifically, examples of the materials for the separators S1, S2 include a resin material such as polybutylene telephthalate (PBT).

The plate-shaped portion 601 having a concavo-convex shape in the separator S1 is distorted due to stress applied from the battery cell 10 more easily than the flat plate-shaped portion 601a in the separator S2. To prevent the separator S1 from being distorted, the strength of the separator S1 is preferably higher than that of the separator S2.

(4) Configurations of Bus Bars and FPC Boards

Details of the bus bars 40, 40a and the FPC boards 50 will be described below. The bus bar 40 for connecting the plus electrode 10a and the minus electrode 10b of the two adjacent battery cells 10 is referred to as the bus bar for two electrodes 40, and the bus bar 40a for connecting the plus electrode 10a or the minus electrode 10b of the one battery cell 10 and the connecting conductor 501 or the power supply line 502 is referred to as the bus bar for one electrode 40a.

Figure 8:
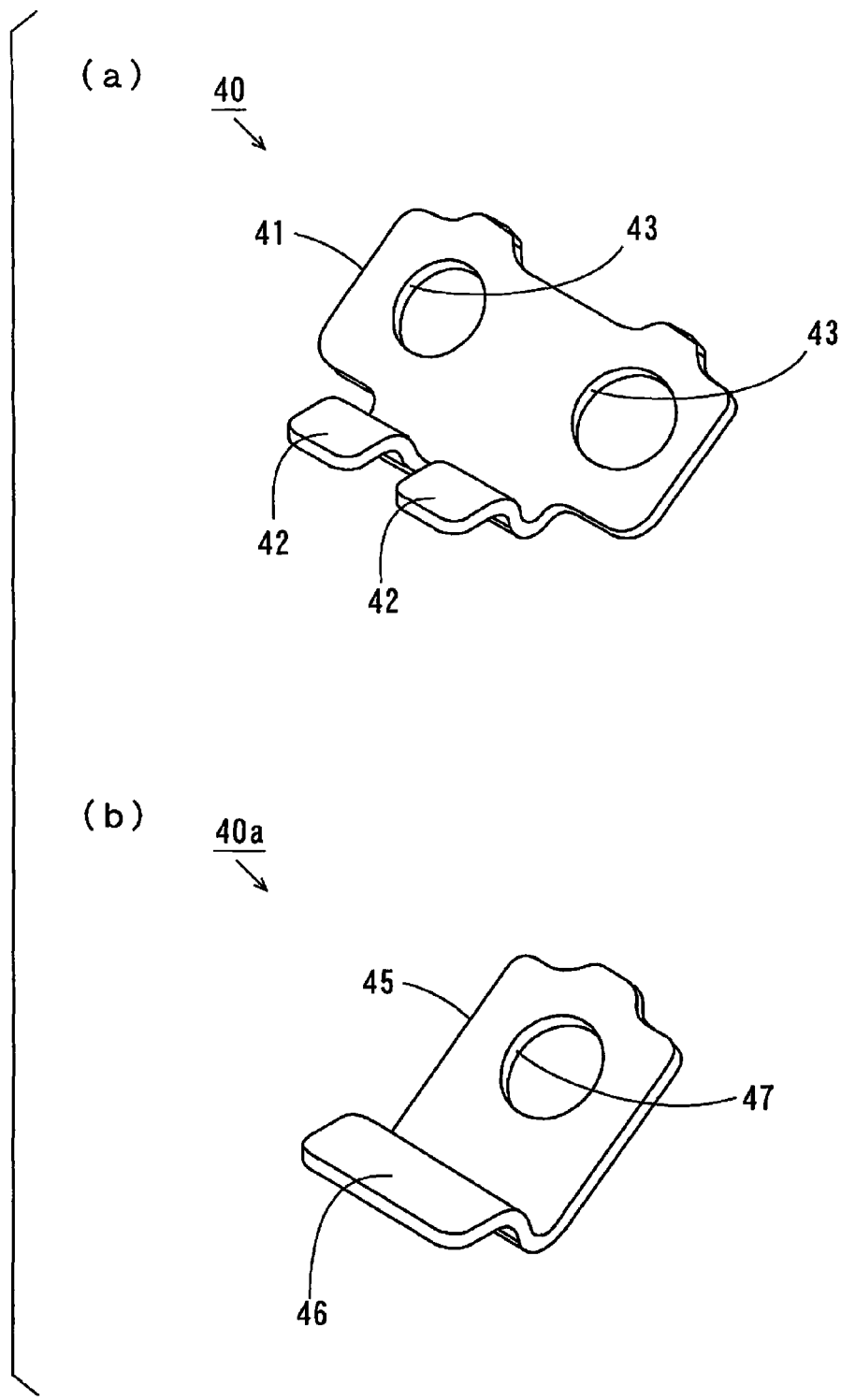
FIG. 8 is an external perspective view of a bus bar.

FIG. 8(a) is an external perspective view of the bus bar for two electrodes 40, and FIG. 8 (b) is an external perspective view of the bus bar for one electrode 40a. The bus bars 40, 40a have a configuration in which a surface of tough pitch copper is nickel-plated.

As illustrated in FIG. 8(a), the bus bar for two electrodes 40 includes a base portion 41 having a substantially rectangular shape and a pair of attachment portions 42 that is bent and extends from one side of the base portion 41 toward its one surface. A pair of circular electrode connection holes 43 is formed in the base portion 41.

As illustrated in FIG. 8(b), the bus bar for one electrode 40a includes a base portion 45 having a substantially square shape and an attachment portion 46 that is bent and extends from one side of the base portion 45 toward its one surface. A circular electrode connection hole 47 is formed in the base portion 45.

Figure 9:
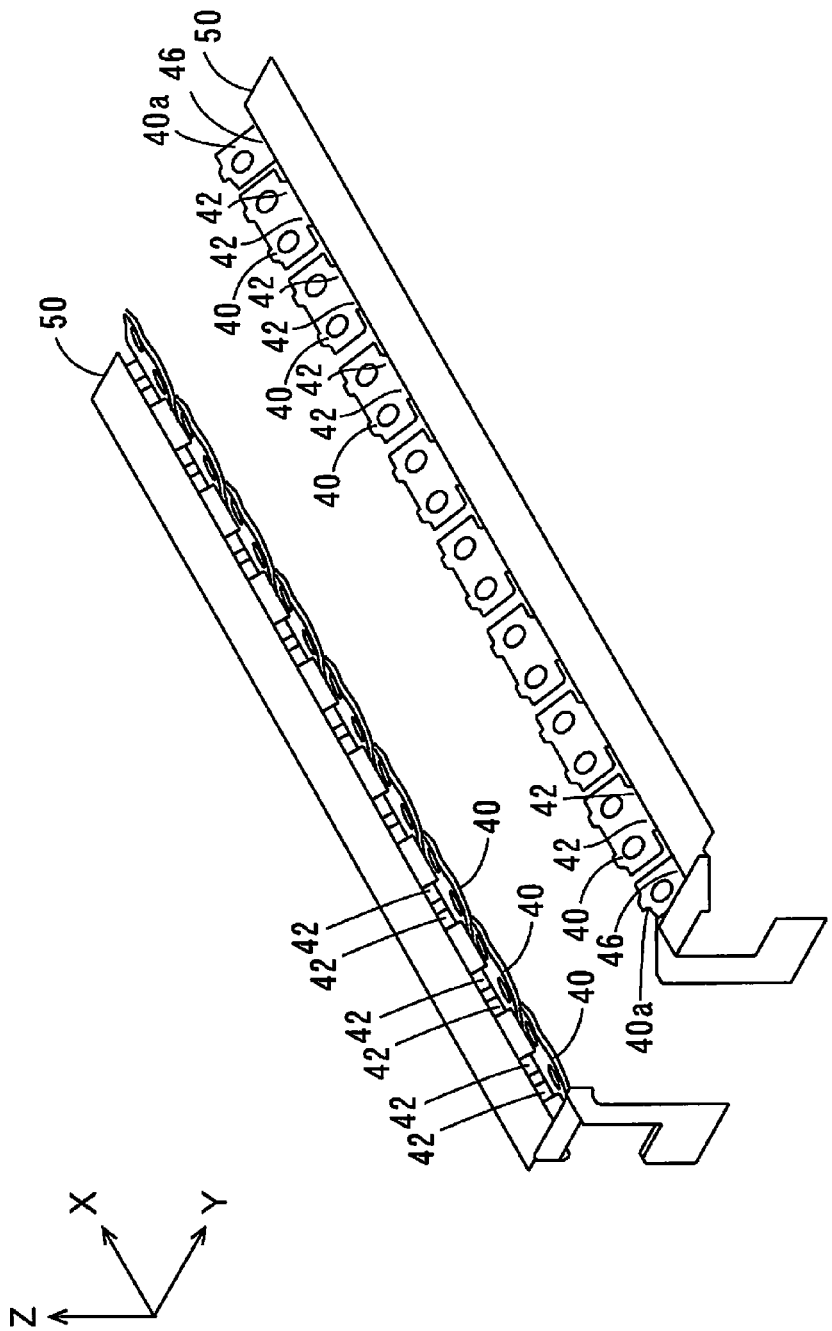
FIG. 9 is an external perspective view illustrating a state where a plurality of bus bars are attached to an FPC board.

FIG. 9 is an external perspective view illustrating a state where the plurality of bus bars 40, 40a are attached to each of the FPC boards 50. As illustrated in FIG. 9, attachment portions 42, 46 of the plurality of bus bars 40, 40a are attached to each of the two FPC boards 50 at predetermined spacings in the X-direction.

When the battery module 100 is manufactured, the two FPC boards 50 having the plurality of bus bars 40, 40a attached thereto in the foregoing manner are each attached on the plurality of battery cells 10 that are integrally fixed by the end plates 92 (see FIG. 2), the upper end frames 93 (see FIG. 2), and the lower end frames 94 (see FIG. 2).

During the attachment, the plus electrode 10a and the minus electrode 10b of the adjacent battery cells 10 are inserted into the electrode connection holes 43, 47 formed in each of the bus bars 40, 40a. A male thread is formed in each of the plus electrode 10a and the minus electrode 10b. With each of the bus bars 40, 40a fitted in the plus electrode 10a and minus electrode 10b of the adjacent battery cells 10, nuts (not illustrated) are respectively screwed in the male threads in the plus electrodes 10a and the minus electrodes 10b.

In this manner, the plurality of bus bars 40, 40a are attached to the plurality of battery cells 10 while keeping the FPC boards 50 in a substantially horizontal attitude.

(5) Arrangement Example of Battery Module

Figure 10:
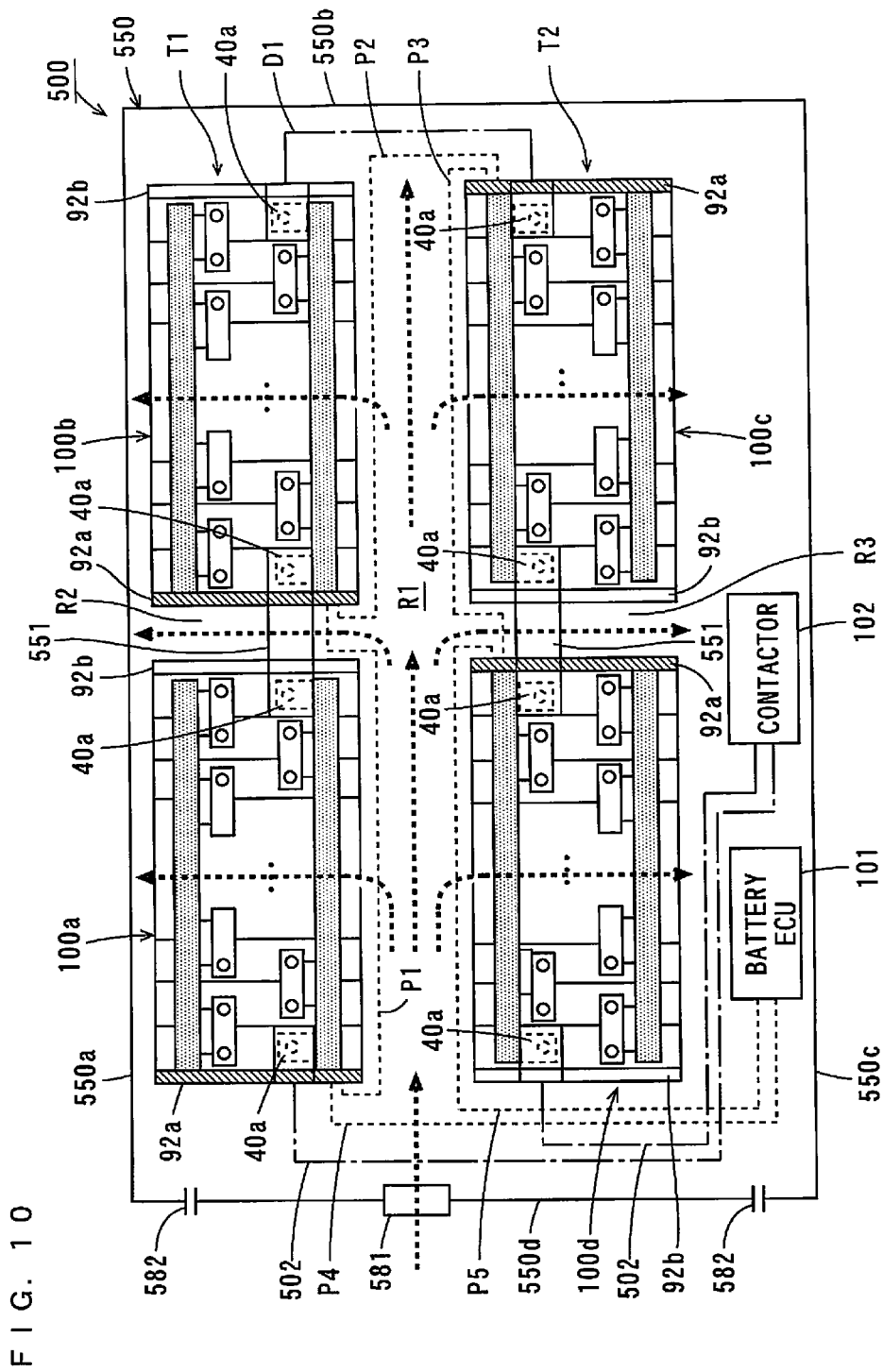
FIG. 10 is a schematic plan view of a battery system.

A specific arrangement example of the plurality of battery modules 100 in the battery system 500 will be described below. FIG. 10 is a schematic plan view of the battery system 500. In the following description, the four battery modules 100 in the battery system 500 are referred to as battery modules 100a, 100b, 100c, 100d, respectively. In pairs of end plates 92 respectively provided in the battery modules 100a, 100b, 100c, 100d, the end plate 92 to which the printed circuit board 21 (see FIG. 2) is attached is referred to as an end plat 92a, and the end plate 92 to which the printed circuit board 21 is not attached is referred to as an end plate 92b. In FIG. 10, the end plate 92a is hatched.

The battery modules 100a, 100b, 100c, 100d, the battery ECU 101, and the contactor 102 are housed in a box-shaped housing 550. The housing 550 has side surface portions 550a, 550b, 550c, 550d. The side surface portions 550a, 550c are parallel to each other, and the side surface portions 550b, 550d are parallel to each other and perpendicular to the side surface portions 550a, 550c.

Within the housing 550, the battery modules 100a, 100b are arranged to line up at a predetermined spacing in a stacked direction of the battery cells 10. The battery modules 100c, 100d are arranged to line up at a predetermined spacing in the stacked direction of the battery cells 10. Hereinafter, the battery modules 100a, 100b arranged to line up are referred to as a module row T1, and the battery modules 100c, 100d arranged to line up are referred to as a module row T2.

Within the housing 550, the module row T1 is arranged along and in close proximity to the side surface portion 550a, and the module row T2 is arranged parallel to the module row T1. The end plates 92a in the battery modules 100a, 100b in the module row T1 are each directed toward the side surface portion 550d. The end plates 92a in the battery modules 100c, 100d in the module row T2 are each directed toward the side surface portion 550b.

A ventilation path R1 is formed between the module row T1 and the module row T2. A ventilation path R2 is formed between the battery module 100a and the battery module 100b in the module row T1. A ventilation path R3 is formed between the battery module 100c and the battery module 100d in the module row T2. The battery ECU 101 and the contactor 102 are arranged in a region between the module row T2 and the side surface portion 550c.

In each of the battery modules 100a, 100b, 100c, 100d, a potential of the plus electrode 10a (FIG. 3) of the battery cell 10 (18th battery cell 10) adjacent to the end plate 92a is the highest, and a potential of the minus electrode 10b (FIG. 3) of the battery cell 10 (first battery cell 10) adjacent to the end plate 92b is the lowest. Hereinafter, in each of the battery modules 100a, 100b, 100c, 100d, the bus bar 40a attached to the plus electrode 10a (FIG. 3) having the highest potential is referred to as a high potential bus bar 40a, and the bus bar 40a attached to the minus electrode 10b (FIG. 3) having the lowest potential is referred to as a low potential bus bar 40a.

The low potential bus bar 40a of the battery module 100a and the high potential bus bar 40a of the battery module 100b are connected to each other via a strip-shaped bus bar 551. The low potential bus bar 40a of the battery module 100b and the high potential bus bar 40a of the battery module 100c are connected to each other via a conductor line D1. The low potential bus bar 40a of the battery module 100c and the high potential bus bar 40a of the battery module 100d are connected to each other via a strip-shaped bus bar 551. Each of the bus bar 551 and the conductor line D1 corresponds to the connecting conductor 501 illustrated in FIG. 1.

The high potential bus bar 40a of the battery module 100a and the low potential bus bar 40a of the battery module 100d are connected to the contactor 102, respectively, via power supply lines 502. The contactor 102 is connected to an HV (High Voltage) connector (not illustrated). The HV connector is connected to a load such as a motor of the electric vehicle.

A printed circuit board 21 (FIG. 2) attached to the end plate 92a in the battery module 100a and a printed circuit board 21 (FIG. 2) attached to the end plate 92a in the battery module 100b are connected to each other via a communication line P1. The printed circuit board 21 attached to the end plate 92a in the battery module 100b and a printed circuit board 21 attached to the end plate 92a in the battery module 100c are connected to each other via a communication line P2. The printed circuit board 21 attached to the end plate 92a in the battery module 100c and a printed circuit board 21 attached to the end plate 92a in the battery module 100d are connected to each other via a communication line P3. The printed circuit boards 21 in the battery modules 100a, 100d are respectively connected to the battery ECU 200 via communication lines P4, P5. The communication lines P1 to P5 constitute the bus 103 illustrated in FIG. 1.

The side surface portion 550d in the housing 550 is provided with a cooling fan 581 and two exhaust ports 582. The cooling fan 581 is arranged on an extension line of the ventilation path R1, and the exhaust ports 582 are respectively arranged at positions in close proximity to the side surface portions 550*a*, 550*c*.

The cooling fan 581 introduces cooling gas into the housing 550. The cooling gas, which has been introduced into the housing 550, flows toward the side surface portion 550*b* through the ventilation path R1 while flowing toward the side surface portions 550*a*, 550*c* from the ventilation path R1, respectively, through the ventilation paths R2, R3.

In each of the battery modules 100*a*, 100*b*, 100*c*, 100*d*, the separators S1 (FIG. 5) respectively form the gaps SE (FIG. 7) between the plurality of battery cells 10. The cooling gas flows toward the side surface portions 550*a*, 550*c* from the ventilation path R1 through the gaps SE (FIG. 7). The cooling gas is emitted out of the housing 550 from the exhaust port 582. Thus, the cooling gas is supplied to the gaps SE between the plurality of battery cells 10 so that each of the battery cells 10 is cooled.

(6) Effects

In the battery module 100 according to the present embodiment, the separators S1, S2 are alternately arranged among the plurality of battery cells 10. Thus, a spacing between one surface of each of the battery cells 10 and the other adjacent battery cell 10 is kept equal to the thickness d1 of the plate-shaped portion 601, and a spacing between the other surface of each of the battery cells 10 and the other adjacent battery cell 10 is kept equal to the thickness d2 of the plate-shaped portion 601*a*.

The separator S1 forms the gap SE between one surface of each of the battery cells 10 and the other adjacent battery cell 10. Cooling gas is supplied to the gap SE so that each of the battery cells 10 is efficiently cooled. A spacing between the other surface of each of the battery cells 10 and the other adjacent battery cell 10 is kept smaller than a spacing between one surface of each of the battery cells 10 and the other adjacent battery cell 10 so that the size of the battery module 100 in the X-direction is reduced. Therefore, the battery module 100 is miniaturized.

(7) Modified Example (7-1) Another Example of Bus Bar

Figure 12:
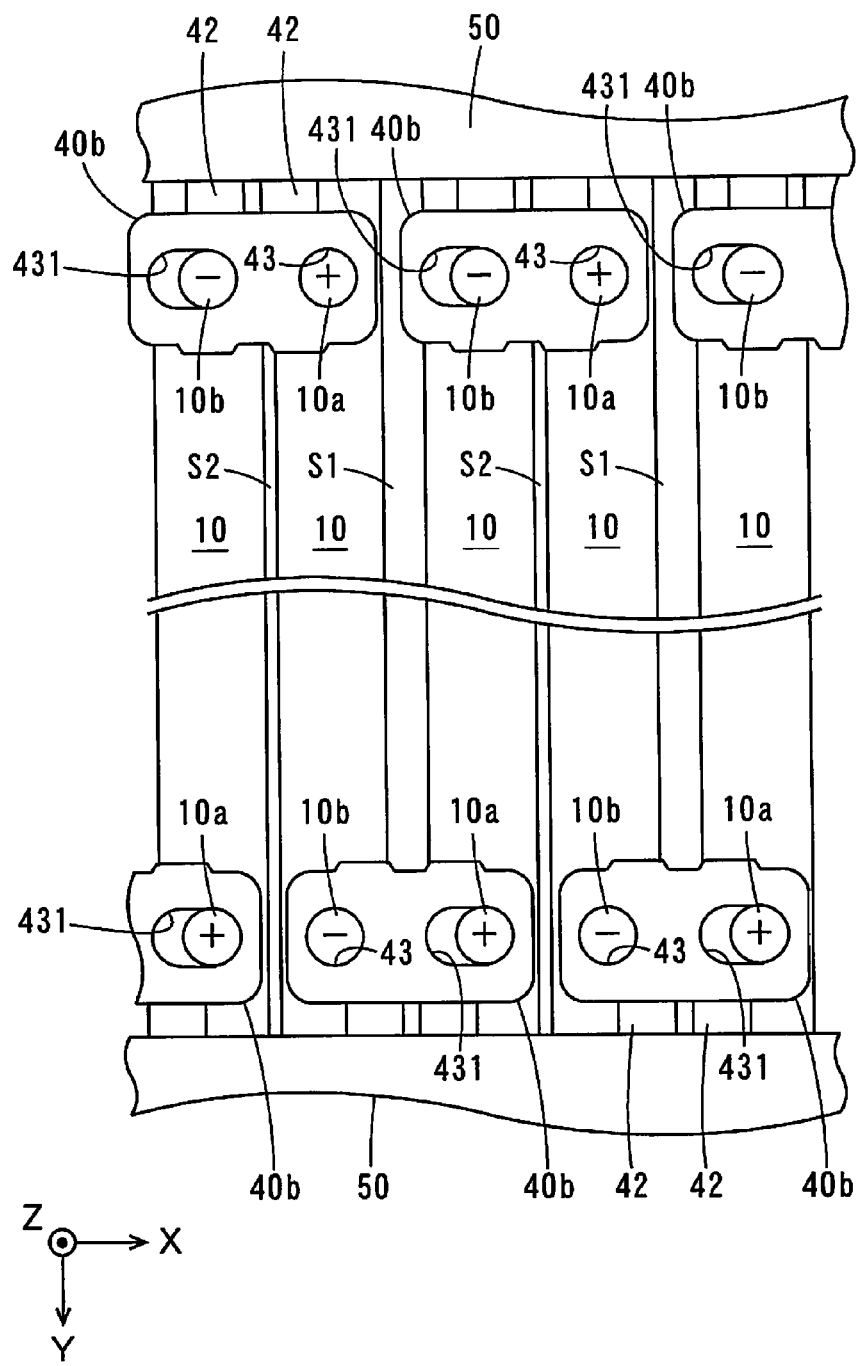
FIG. 12 is a schematic plan view illustrating a state where the bus bar illustrated in FIG. 11 is attached to a plurality of battery cells.

FIG. 11 is an external perspective view illustrating another example of the bus bar for two electrodes 40. FIG. 12 is a schematic plan view illustrating a state where a bus bar illustrated in FIG. 11 is attached to a plurality of battery cells 10.

A bus bar 40*b* illustrated in FIG. 11 differs from the bus bar 40 illustrated in FIG. 8 in that an oval electrode connection hole 431 extending in an X-direction (see FIG. 12) is formed in the base portion 41 instead of one circular electrode connection hole 43.

In the present embodiment, spacings between battery cells 10, which are respectively kept by separators S1, S2, differ from each other so that there is a variation in the distance between a plus electrode 10*a* and a minus electrode 10*b*, which are to be connected to each other, of the adjacent battery cells 10 (hereinafter referred to as a between-electrode distance). More specifically, the between-electrode distance between the battery cells 10, which are adjacent to each other with the separator S1 sandwiched therebetween, is larger than the between-electrode distance between the battery cells 10, which are adjacent to each other with the separator S2 sandwiched therebetween.

When the bus bar 40 illustrated in FIG. 8 is used, the distance between the pair of electrode connection holes 43 and the between-electrode distance are required to be set equal to each other. Therefore, different types of bus bars 40 are required to be prepared depending on a case where the plus electrode 10*a* and the minus electrode 10*b*, which are adjacent to each other with the separator S1 sandwiched therebetween, of the battery cells 10 are connected to each other and a case where the plus electrode 10*a* and the minus electrode 10*b*, which are adjacent to each other with the separator S2 sandwiched therebetween, of the battery cells 10 are connected to each other.

On the other hand, when the bus bar 40*b* illustrated in FIG. 11 is used, the plus electrode 10*a* or the minus electrode 10*b* can be arranged at any position within the oval electrode connection hole 431. Even if the between-electrode distances are not equal to each other, therefore, the common bus bar 40*b* can be used.

In the example illustrated in FIG. 12, if the battery cells 10, which are adjacent to each other with the separator S1 sandwiched therebetween, are connected to each other, the plus electrode 10*a* of one of the battery cells 10 is inserted into the electrode connection hole 431 in the bus bar 40*b*, and the minus electrode 10*b* of the other battery cell 10 is inserted into the electrode connection hole 43 in the bus bar 40*b*. In this case, the plus electrode 10*a* of one of the battery cells 10 is positioned at one end of the electrode connection hole 431. If the battery cells 10, which are adjacent to each other with the separator S2 sandwiched therebetween, are connected to each other, the plus electrode 10*a* of one of the battery cells 10 is inserted into the electrode connection hole 43 in the bus bar 40*b*, and the minus electrode 10*b* of the other battery cell 10 is inserted into the electrode connection hole 431 in the bus bar 40*b*. In this case, the minus electrode 10*b* of the other battery cell 10 is positioned at the other end of the electrode connection hole 431.

If the plus electrode 10*a* and the minus electrode 10*b* of the battery cells 10, which are adjacent to each other with the separator S1 sandwiched therebetween, are connected to each other, and if the plus electrode 10*a* and the minus electrode 10*b* of the battery cells 10, which are adjacent to each other with the separator S2 sandwiched therebetween, are connected to each other, the common bus bar 40*b* can be used.

Figure 13:
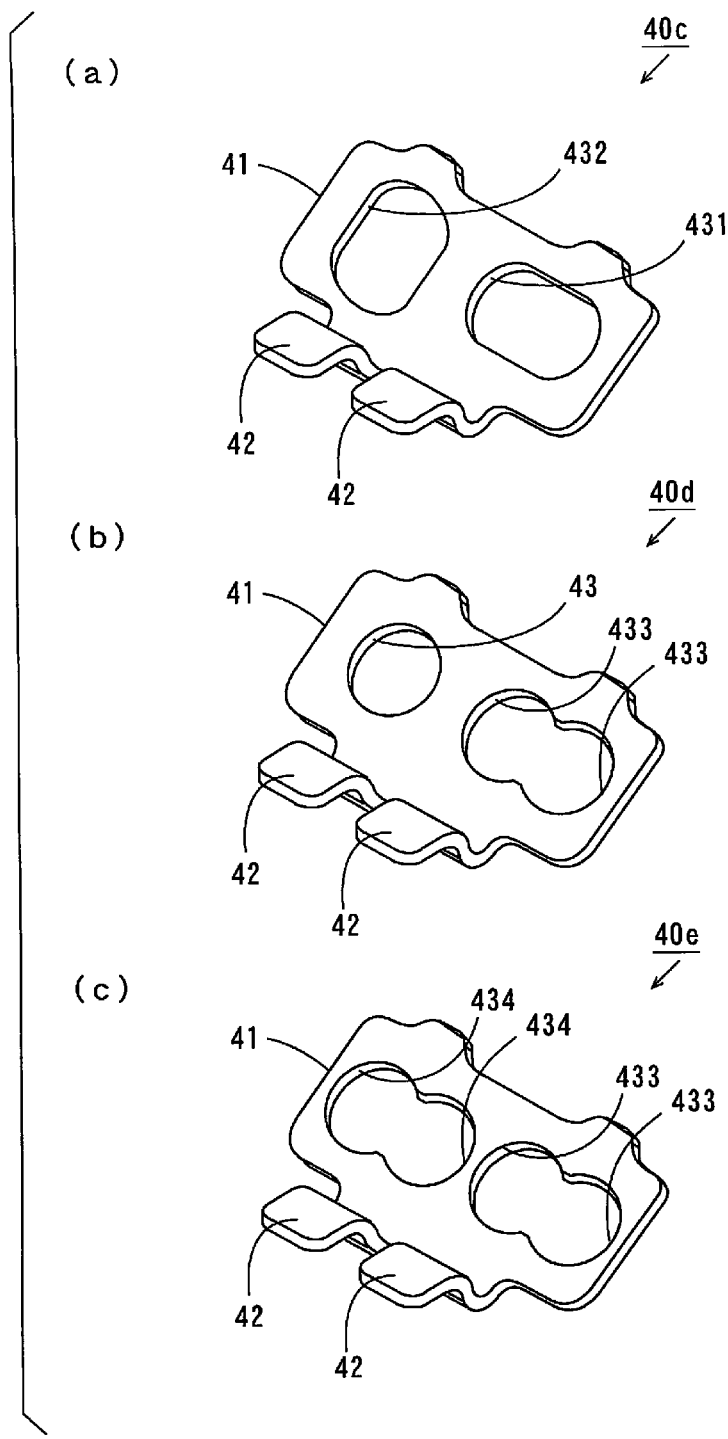
FIG. 13 is a schematic plan view illustrating still another example of a bus bar.

FIG. 13 is a schematic plan view illustrating still another example of the bus bar 40.

A bus bar 40*c* illustrated in FIG. 13 (*a*) differs from the bus bar 40*b* illustrated in FIG. 11 in that an oval electrode connection hole 432 extending in a Y-direction (see FIG. 12) is formed in a base portion 41 instead of the other circular electrode connection hole 43.

The respective positions of the plus electrode 10*a* and the minus electrode 10*b*, which are to be connected to each other, of the adjacent battery cells 10 may be shifted in the Y-direction depending on a manufacturing error or an assembling error, for example. If the bus bar 40*c* is used, the direction of the bus bar 40*c* can be adjusted with the bus bar 40*c* fitted in the plus electrode 10*a* and the minus electrode 10*b* of the adjacent battery cells 10. Even if the plus electrode 10*a* and the minus electrode 10*b*, which are to be connected to each other, are shifted in the Y-direction, therefore, the direction of the bus bar 40*c* can be kept constant. Therefore, the plurality of bus bars 40*c* are prevented from varying in directions. As a result, the FPC board 50 is prevented from being distorted.

A bus bar 40*d* illustrated in FIG. 13 (*b*) differs from the bus bar 40*b* illustrated in FIG. 11 in that two circular electrode connection holes 433 are integrally formed instead of the oval electrode connection hole 431.

In this case, the distance between the one electrode connection hole 433 (the outer electrode connection hole 433) and an electrode connection hole 43 is set equal to the between-electrode distance between the battery cells 10 that are adjacent to each other with the separator 51 sandwiched therebetween, and the distance between the other electrode connection hole 433 (the inner electrode connection hole 433) and the electrode connection hole 43 is set equal to the between-electrode distance between the battery cells 10 that are adjacent to each other with the separator S2 sandwiched therebetween.

If the bus bar 40d is attached to the plus electrode 10a and the minus electrode 10b, which are to be connected to each other, of the battery cells 10 that are adjacent to each other with the separator S1 sandwiched therebetween, one of the plus electrode 10a and the minus electrode 10b is fitted in the one electrode connection hole 433 in the bus bar 40d, and the other of the plus electrode 10a and the minus electrode 10b is fitted in the electrode connection hole 43 in the bus bar 40d. If the bus bar 40d is attached to the plus electrode 10a and the minus electrode 10b, which are to be connected to each other with the separator S2 sandwiched therebetween, one of the plus electrode 10a and the minus electrode 10b is fitted in the other electrode connection hole 433 in the bus bar 40d, and the other of the plus electrode 10a and the minus electrode 10b is fitted in the electrode connection hole 43 in the bus bar 40d.

If the plus electrode 10a and the minus electrode 10b in the battery cells 10 that are adjacent to each other are connected to each other with the separator 51 sandwiched therebetween and if the plus electrode 10a and the minus electrode 10b in the battery cells 10 that are adjacent to each other are connected to each other with the separator S2 sandwiched therebetween, the common bus bar 40d can be used. Since the plus electrode 10a and the minus electrode 10b are fixed within the electrode connection hole 40d, the bus bar 40d is stably attached to the plus electrode 10a and the minus electrode 10b.

A bus bar 40e illustrated in FIG. 13 (c) differs from the bus bar 40d illustrated in FIG. 13 (b) in that two circular electrode connection holes 434 are integrally formed instead of the other circular electrode connection hole 43.

In this case, even if the between-electrode distances differ depending on the difference in thickness between the separators 51, S2 or a manufacturing error, for example, the plus electrode 10a and the minus electrode 10b, which are to be selectively connected to each other, are respectively fitted in either one of the two electrode connection holes 433 and either one of the two electrode connection holes 434 so that the plus electrode 10a and the minus electrode 10b can be connected to each other using the common bus bar 40e.

(7-2) Another Arrangement Example of Plus Electrode and Minus Electrode

Figure 14:
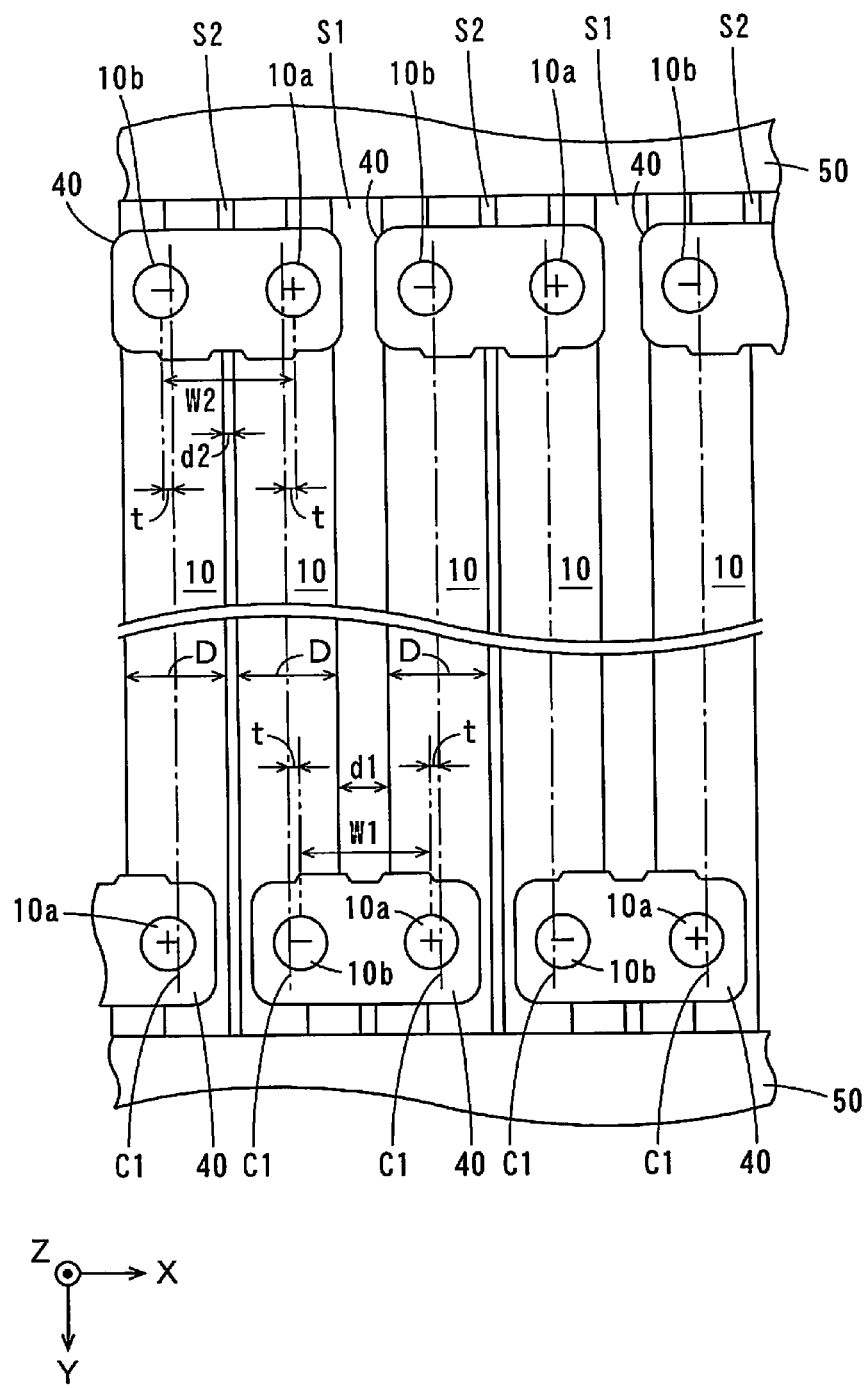
FIG. 14 is a schematic plan view illustrating another arrangement example of a plus electrode and a minus electrode of each battery cell.

FIG. 14 is a schematic plan view illustrating another arrangement example of the plus electrode 10a and the minus electrode 10b in each of the battery cells 10. FIG. 14 illustrates lines (hereinafter referred to as center lines) Cl passing through the center between one surface and the other surface, which are perpendicular to the X-direction, of each of the battery cells 10.

In the example illustrated in FIG. 14, respective axial centers of the plus electrode 10a and the minus electrode 10b of each of the battery cells 10 do not match the center line Cl. More specifically, the plus electrode 10a and the minus electrode 10b of each of the battery cells 10 are shifted by a distance t from the center line Cl to come closer to one surface, which contacts the separator 51, of the battery cell 10.

Letting D be the thickness of each of the battery cells 10, W1 be a between-electrode distance between the battery cells 10 that are adjacent to each other with the separator S1 sandwiched therebetween, and W2 be a between-electrode distance between the battery cells 10 that are adjacent to each other with the separator S2 sandwiched therebetween, the following equations (1) and (2) hold, where d1 is the thickness of the plate-shaped portion 601 (FIG. 5) in the separator S1 (a spacing between the battery cells 10 that are adjacent to each other with the separator S1 sandwiched therebetween), and d2 is the thickness of the plate-shaped portion 601a (FIG. 6) in the separator S2 (a spacing between the battery cells 10 that are adjacent to each other with the separator S2 sandwiched therebetween):

$$2(D/2-t)+d1=W1 \quad (1)$$

$$2(D/2+t)+d2=W2 \quad (2)$$

The distance t is set so that the between-electrode distance W1 and the between-electrode distance W2 are equal to each other. Therefore, the distance t is set to satisfy the following equation:

$$2(D/2-t)+d1=2(D/2+t)+d2$$

The distance t is expressed by the following equation from the foregoing equation:

$$t=(d1-d2)/4$$

In this case, the plus electrode 10a and the minus electrode 10b of the adjacent battery cells 10 can be connected to each other using the plurality of battery cells 10 having the same configuration and the plurality of bus bars 40 (FIG. 8) having the same configuration.

(7-3) Another Example of Separator

While the plate-shaped portions 602 in all the separators S1 are the same in the thickness (the size of an irregularity) in the above-mentioned embodiment, the present invention is not limited to this. The plate-shaped portions 602 in the separators S1 may differ in the thickness depending on positions where they are arranged. For example, the thickness of the plate-shaped portion 602 in the separator S1 arranged in an intermediate portion of the battery module 100 may be larger than the thicknesses of the plate-shaped portions 602 in the separators S1 arranged at both ends of the battery module 100 and their vicinities (positions close to the end plates 92a, 92b).

In the intermediate portion of the battery module 100, heat may stay more easily than that at both ends of the battery module 100. Therefore, at the time of charge and discharge, the temperature of the battery cell 10 arranged in the intermediate portion of the battery module 100 is easily higher than the temperatures of the battery cells 10 arranged at both the ends of the battery module 100.

The thickness of the separator S1 arranged in the intermediate portion of the battery module 100 is set larger than the thicknesses of the separators S1 arranged at both the ends of the battery module 100 so that cooling gas easily flows into the intermediate portion of the battery module 100. Thus, the battery cell 10 arranged in the intermediate portion of the battery module 100 is more effectively cooled. As a result, the temperatures of the battery cells 10 arranged at both the ends of the battery module 100 and the temperature of the battery cell 10 arranged in the intermediate portion of the battery module 100 can be kept substantially uniform.

(7-4) Another Example for Keeping Spacing between Battery Cells

While the separators S1, S2 are arranged between the adjacent battery cells 10 so that a spacing between the adjacent battery cells 10 is kept, the spacing between the adjacent battery cells 10 may be kept using another method. For example, a plurality of protrusions are respectively provided to protrude inward from the upper end frame 93 and the lower end frame 94, and the plurality of protrusions are respectively inserted into areas among the adjacent battery cells 10 so that the spacing between the adjacent battery cells 10 may be kept.

(7-5) Another Example of Battery System

Figure 15:
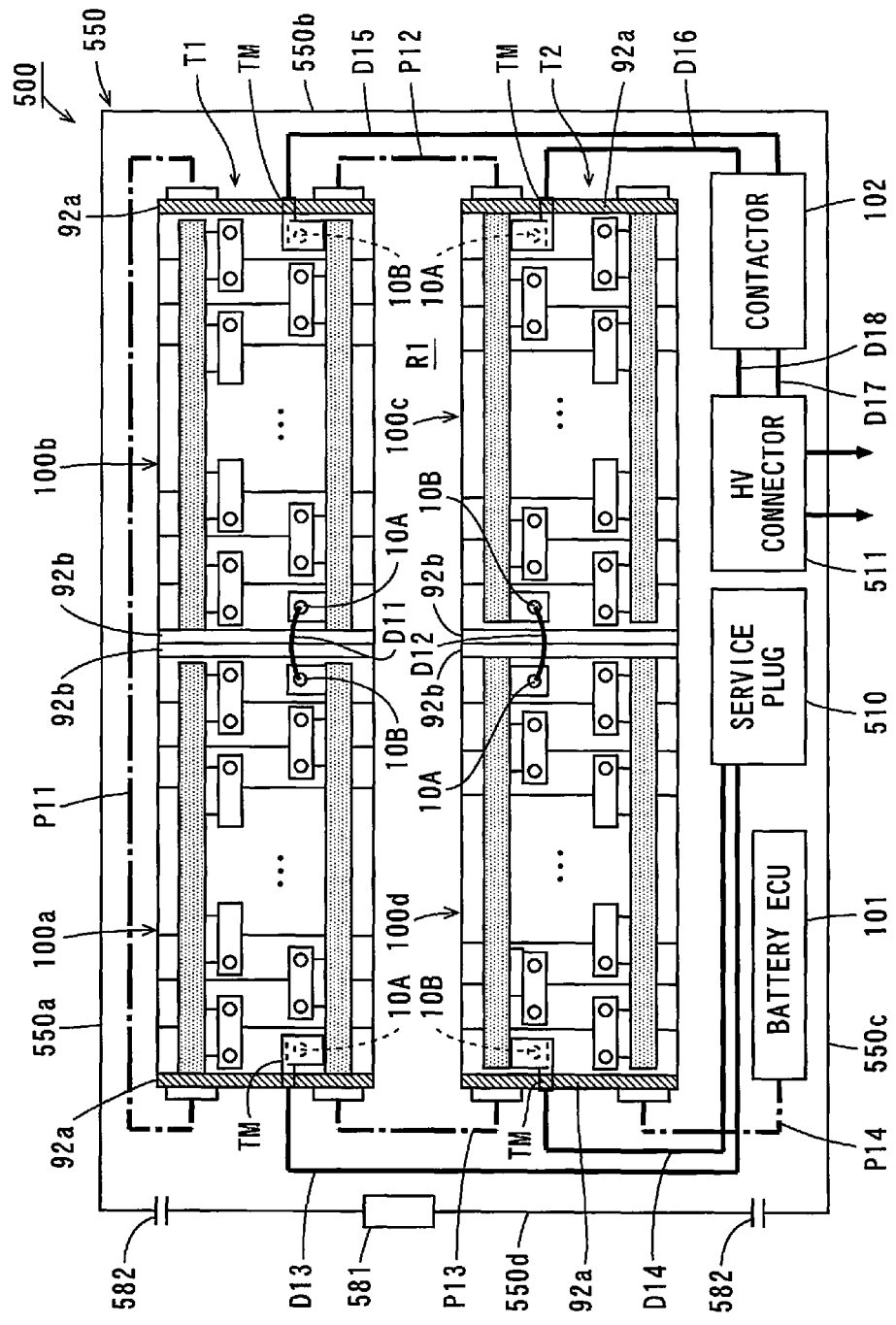
FIG. 15 is a schematic plan view illustrating another example of a battery system.

FIG. 15 is a schematic plan view illustrating another example of the battery system 500. The example illustrated in FIG. 15 will be described by referring to differences from the example illustrated in FIG. 10. A battery system 500 illustrated in FIG. 15 further includes a service plug 510 and a high voltage (HV) connector 511. In a region between a module row T2 and a side surface portion 550c in the housing 550, a battery ECU 101, the service plug 510, the HV connector 511, and a contactor 102 are arranged to line up in this order from a side surface portion 550d to a side surface portion 550b.

Battery modules 100a, 100b constituting the module row T1 are arranged so that end plates 92b in the battery modules contact each other. In this case, an end plate 92a in the battery module 100a is directed toward the side surface portion 550d, and an end plate 92a in the battery module 100b is directed toward the side surface portion 550b. Battery modules 100c, 100d constituting the module row T2 are arranged so that respective end plates 92b in the battery modules contact each other. In this case, an end plate 92a in the battery module 100d is directed toward the side surface portion 550d, and an end plate 92a in the battery module 100c is directed toward the side surface portion 550b.

In each of the battery module 100a in the module row T1 and the battery module 100c in the module row T2, a potential at a plus electrode 10a of the battery cell 10 adjacent to the end plate 92a is the highest, and a potential at a minus electrode 10b of the battery cell 10 adjacent to the end plate 92b is the lowest. On the other hand, in each of the battery module 100b in the module row T1 and the battery module 100d in the module row T2, a potential at a minus electrode 10b of the battery cell 10 adjacent to the end plate 92a is the lowest, and a potential at a plus electrode 10a of the battery cell 10 adjacent to the end plate 92b is the highest. In each of the battery modules 100a to 100d, the highest-potential plus electrode 100a is referred to as a high-potential electrode 10A, and the lowest-potential minus electrode 10b is referred to as a low-potential electrode 10B.

A low-potential electrode 10B of the battery module 100a and a high-potential electrode 10A of the battery module 100b are connected to each other via an electric power line D11. A low-potential electrode 10B of the battery module 100c and a high-potential electrode 10A of the battery module 100d are connected to each other via an electric power line D12. Conductive relay members TM are respectively attached to the high-potential electrode 10A of the battery module 100a, a low-potential electrode 10B of the battery module 100b, a high-potential electrode 10A of the battery module 100c, and a low-potential electrode 10B of the battery module 100d.

The relay member TM attached to the high-potential electrode 10A of the battery module 100a is connected to the service plug 510 via an electric power line D13, and the relay member TM attached to the low-potential electrode 10B of the battery module 100d is connected to the service plug 510 via an electric power line D14. With the service plug 510 turned on, the battery modules 100a, 100b, 100c, 100d are connected in series. In this case, a potential at the high-potential electrode 10A of the battery module 100c is the highest, and a potential at the low-potential electrode 10B of the battery module 100b is the lowest.

The service plug 510 is turned off by a worker when the battery system 500 is maintained, for example. If the service plug 510 is turned off, a series circuit of the battery modules 100a, 100b and a series circuit of the battery modules 100c, 100d are electrically separated from each other. In this case, a current path between the plurality of battery modules 100a to 100d is blocked. Thus, safety during maintenance is ensured.

The relay member TM attached to the low-potential electrode 10B of the battery module 100b is connected to the contactor 102 via an electric power line D15, and the relay member TM attached to the high-potential electrode 10A of the battery module 100c is connected to the contactor 102 via an electric power line D16. The contactor 102 is connected to the HV connector 511 via electric power lines D17, D18. The HV connector 511 is connected to a load such as a motor of the electric vehicle.

With the contactor 102 turned on, the low-potential electrode 10B of the battery module 100b is connected to the HV connector 511 via the power supply lines D15, D17 while the high-potential electrode 10A of the battery module 100c is connected to the HV connector 511 via the power supply lines D16, D18. Thus, electric power is supplied to the load from the battery modules 100a, 100b, 100c, 100d with the service plug 510 and the contactor 102 turned on. The battery modules 100a, 100b, 100c, 100d are charged with the service plug 510 and the contactor 102 turned on.

When the contactor 102 is turned off, connection between the battery module 100b and the HV connector 511 and connection between the battery module 100c and the HV connector 511 are cut off.

When the battery system 500 is maintained, the contactor 102, together with the service plug 510, is turned off by the worker. In this case, a current path between the plurality of battery modules 100a to 100d is reliably blocked. Thus, safety during maintenance is sufficiently ensured. If respective voltages of the battery modules 100a, 100b, 100c, 100d are equal to one another, a total voltage of the series circuit of the battery modules 100a, 100b and a total voltage of the series circuit of the battery modules 100c, 100d are equal to each other. Therefore, a high voltage is prevented from being generated within the battery system 500 during maintenance.

The printed circuit board 21 (see FIG. 2) in the battery module 100a and the printed circuit board 21 in the battery module 100b are connected to each other via a communication line P11. The printed circuit board 21 in the battery module 100b and the printed circuit board 21 in the battery module 100c are connected to each other via a communication line P12. The printed circuit board 21 in the battery module 100a and the printed circuit board 21 in the battery module 100d are connected to each other via a communication line P13. The printed circuit board 21 in the battery module 100d is connected to the battery ECU 101 via a communication line P14. The communication lines P11 to P14 constitute a communication bus. Voltages, currents, and temperatures, which have been detected by the detection circuits 20 in the battery modules 100a to 100d, are given to the battery ECU 101 via the communication lines P11 to P14.

A cooling fin 581 and two exhaust ports 582 are provided in the side surface portion 550d in the housing 550, like those in the example illustrated in FIG. 10. The cooling fin 581 introduces cooling gas into the housing 550.

In this example, the separator S1 (FIG. 5) forms a gap SE (FIG. 7) between one surface of each of the battery cells 10 and the other battery cell 10. The cooling gas, which has been introduced into the housing 550 by the cooling fin 581, flows through a ventilation path R1 between the module rows T1, T2 while flowing toward the side surface portions 550a, 550c from the ventilation path R1 through the gap SE formed between the adjacent battery cells 10. The cooling air is emitted out of the housing 550 from the exhaust ports 582. Thus, each of the battery cells 10 is efficiently cooled.

Since a spacing between the other surface of each of the battery cells 10 and the other adjacent battery cell 10 is kept smaller than a spacing between the one surface of each of the battery cells 10 and the other adjacent battery cell 10, the battery modules 100a to 100d are miniaturized. Thus, the battery system 500 can be miniaturized.

(8) Electric Vehicle

An electric vehicle including the above-mentioned battery system 500 will be described below. An electric automobile will be described below as one example of the electric vehicle.

Figure 16:
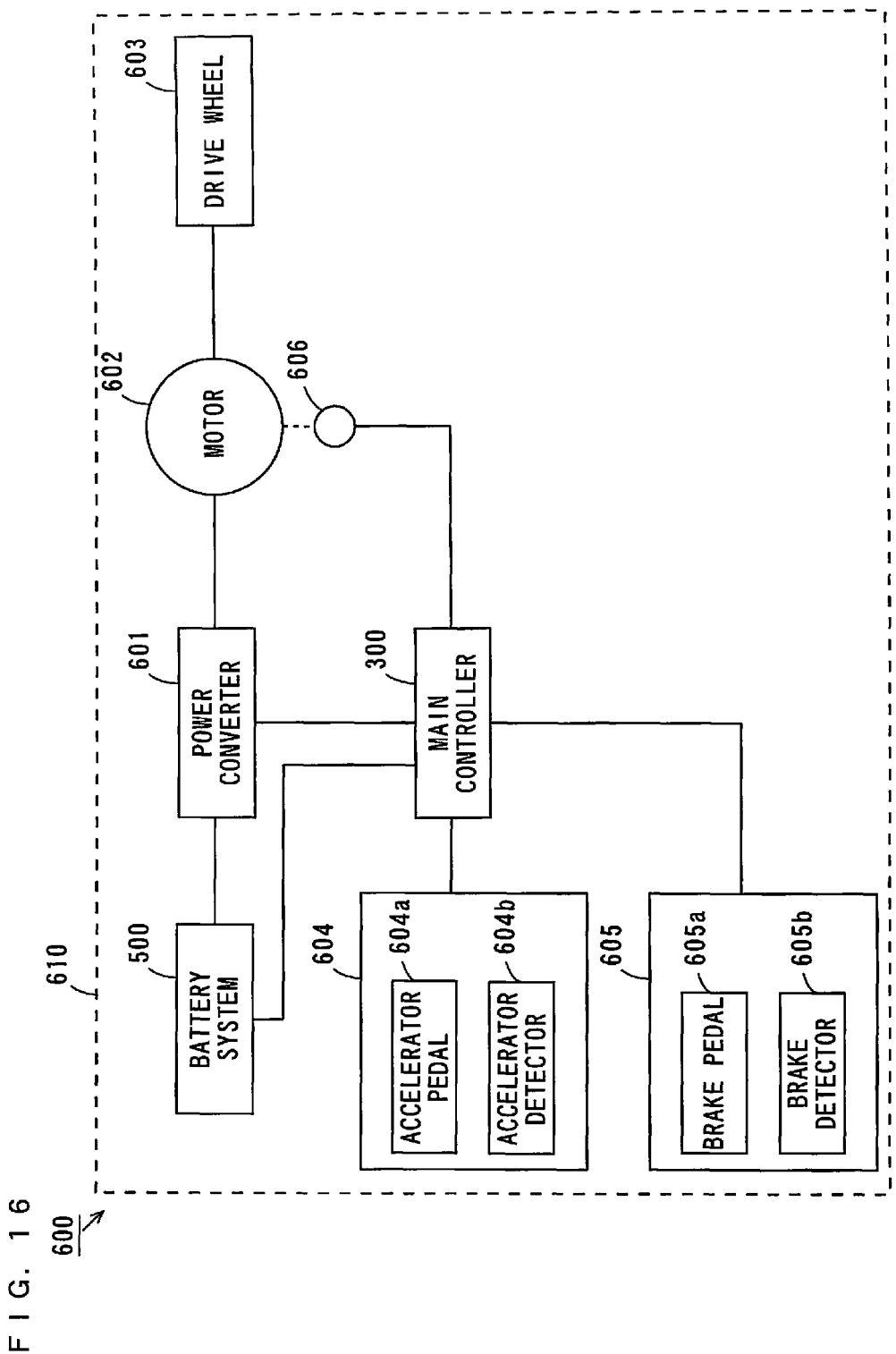
FIG. 16 is a block diagram illustrating a configuration of an electric automobile including the battery system illustrated in FIG. 1.

FIG. 16 is a block diagram illustrating a configuration of the electric automobile including the battery system 500 illustrated in FIG. 1. As illustrated in FIG. 16, an electric automobile 600 according to the present embodiment includes a vehicle body 610. The vehicle body 610 includes the main controller 300 and the battery system 500 illustrated in FIG. 1, a power converter 601, a motor 602, a drive wheel 603, an accelerator device 604, a brake device 605, and a rotational speed sensor 606. When the motor 602 is an alternating current (AC) motor, the power converter 601 includes an inverter circuit.

In the present embodiment, the battery system 500 is connected to the motor 602 via the power converter 601 while being connected to the main controller 300. As described above, charged capacities of a plurality of battery modules 100 (FIG. 1) and a value of a current flowing through the battery modules 100 are fed to the main controller 300 from the battery ECU 101 (FIG. 1) constituting the battery system 500. The accelerator device 604, the brake device 605, and the rotational speed sensor 606 are connected to the main controller 300. The main controller 300 is composed of a CPU (Central Processing Unit) and a memory or composed of a microcomputer, for example.

The accelerator device 604 includes an accelerator pedal 604a included in the electric automobile 600 and an accelerator detector 604b that detects an operation amount (depression amount) of the accelerator pedal 604a. When a driver operates the accelerator pedal 604a, the accelerator detector 604b detects an operation amount of the accelerator pedal 604a using a state where the driver does not operate the accelerator pedal 604a as a basis. The detected operation amount of the accelerator pedal 604a is fed to the main controller 300.

The brake device 605 includes a brake pedal 605a included in the electric automobile 600 and a brake detector 605b that detects an operation amount (depression amount) of the brake pedal 605a by the driver. When the driver operates the brake pedal 605a, the brake detector 605b detects the operation amount. The detected operation amount of the brake pedal 605a is fed to the main controller 300.

The rotational speed sensor 606 detects a rotational speed of the motor 602. The detected rotational speed is fed to the main controller 300.

As described above, the charged capacity of the battery module 100, the value of the current flowing through the battery module 100, the operation amount of the accelerator pedal 604a, the operation amount of the brake pedal 605a, and the rotational speed of the motor 602 are given to the main controller 300. The main controller 300 performs charge/discharge control of the battery modules 100 and power conversion control of the power converter 601 based on the information.

Electric power generated in the battery modules 100 is supplied from the battery system 500 to the power converter 601 at the time of start-up and acceleration of the electric automobile 600 based on an accelerator operation, for example.

Further, the main controller 300 calculates a torque (commanded torque) to be transmitted to the drive wheel 603 based on the fed operation amount of the accelerator pedal 604a, and feeds a control signal based on the commanded torque to the power converter 601.

The power converter 601, which has received the above-mentioned control signal, converts the electric power supplied from the battery system 500 into electric power (driving electric power) required to drive the drive wheel 603. Thus, the driving electric power obtained by the conversion in the power converter 601 is supplied to the motor 602, and the torque generated by the motor 602 based on the driving electric power is transmitted to the drive wheel 603.

On the other hand, the motor 602 functions as a power generation apparatus at the time of deceleration of the electric automobile 600 based on a brake operation. In this case, the power converter 601 converts regenerated electric power generated by the motor 602 to electric power suited to charge the battery modules 100, and supplies the electric power to the battery modules 100. Thus, the battery modules 100 are charged.

While an example in which the battery module 100 is loaded into the electric vehicle has been described, the battery module 100 may be loaded in another movable body such as a ship, an airplane, or a walking robot.

The ship, which is loaded with the battery module 100, includes a hull instead of the vehicle body 610 illustrated in FIG. 16, includes a screw instead of the drive wheel 603, includes an accelerator inputter instead of the accelerator device 604, and includes a deceleration inputter instead of the brake device 605, for example. A driver operates the acceleration inputter instead of the accelerator device 604 in accelerating the hull, and operates the deceleration inputter instead of the brake device 605 in decelerating the hull. In this case, the motor 602 is driven with electric power from the battery module 100, and a torque generated by the motor 602 is transmitted to the screw to generate an impulsive force so that the hull moves.

Similarly, the airplane, which is loaded with the battery module 100, includes an airframe instead of the vehicle body 610 illustrated in FIG. 16, includes a propeller instead of the drive wheel 603, includes an acceleration inputter instead of the accelerator device 604, and includes a deceleration inputter instead of the brake device 605, for example. The walking robot, which is loaded with the battery module 100, includes a body instead of the vehicle body 610 illustrated in FIG. 16, includes a foot instead of the drive wheel 603, includes an acceleration inputter instead of the accelerator device 604, and includes a deceleration inputter instead of the brake device 605, for example.

Thus, in the movable body, which is loaded with the battery module 100, a power source (motor) converts the electric power from the battery module 100 into power, and the main movable body (the vehicle body, the hull, the airframe, or the body) moves with the power.

(9) Power Supply Device (9-1) Overall Configuration

Figure 17:
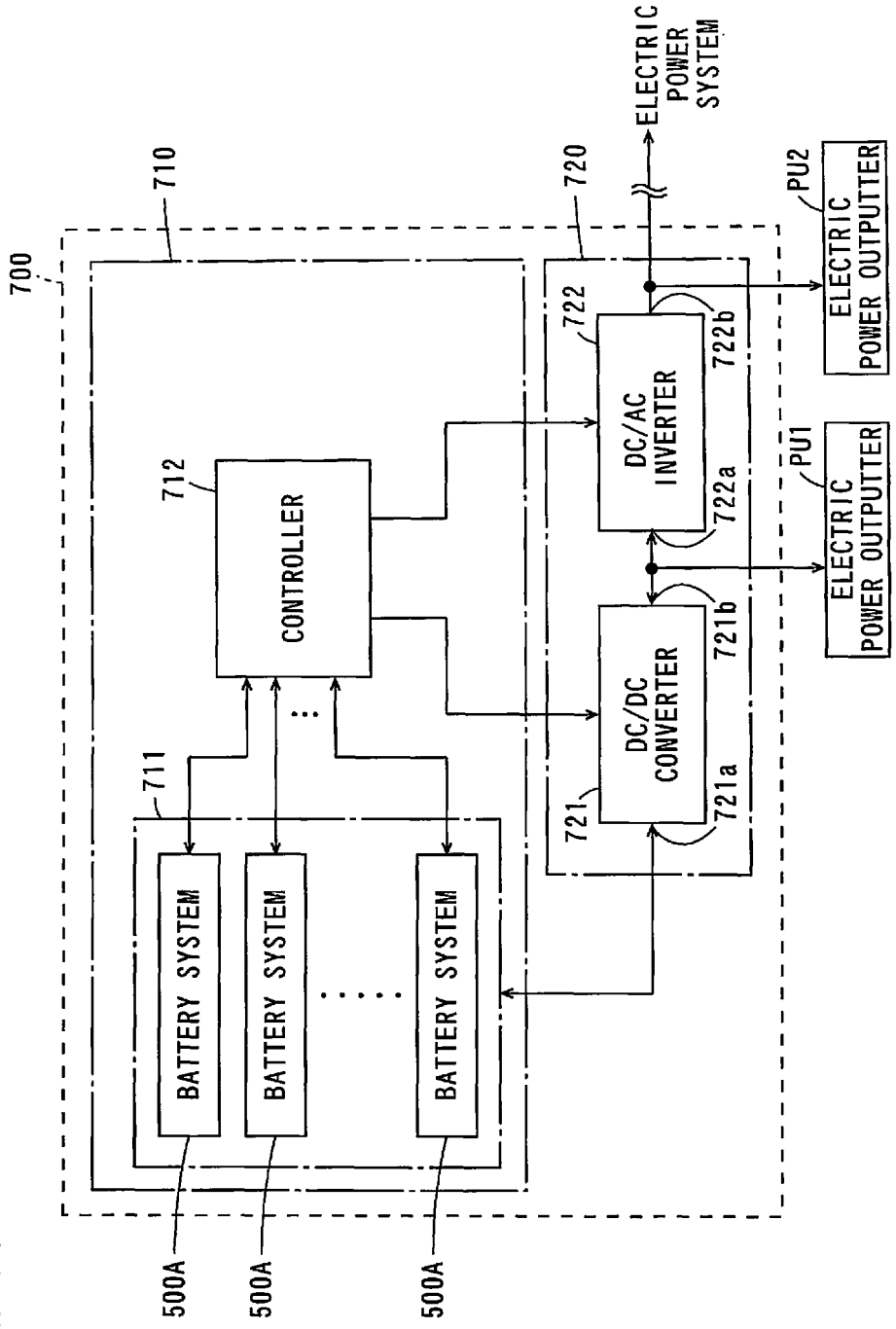
FIG. 17 is a block diagram illustrating a configuration of a power supply device.

A power supply device according to an embodiment of the present invention will be described. FIG. 17 is a block diagram illustrating a configuration of a power supply device according to the embodiment of the present invention.

As illustrated in FIG. 17, a power supply device 700 includes a power storage device 710 and a power conversion device 720. The power storage device 710 includes a battery system group 711 and a controller 712. The battery system group 711 includes a plurality of battery systems 500A. Each of the battery systems 500A includes a plurality of battery modules 100, which are connected in series, illustrated in FIG. 2. The plurality of battery systems 500A may be connected in parallel, or may be connected in series. Details of the battery system 500A will be described below.

The controller 712 includes a CPU and a memory, or a microcomputer, for example. The controller 712 is connected to a detection circuit 20 in each of the battery modules 100 (FIG. 2) included in each of the battery systems 500A. A voltage, a current, and a temperature, which have been detected by the detection circuit 20 in each of the battery modules 100, are fed to the controller 712. The controller 712 calculates a charged capacity of each of the battery cells 10 (FIG. 2) based on the voltage, the current, and the temperature, which have been given from each of the detection circuits 20, and controls the power conversion device 720 based on the calculated charged capacity.

The power conversion device 720 includes a DC/DC (direct current/direct current) converter 721 and a DC/AC (direct current/alternating current) inverter 722. The DC/DC converter 721 has input/output terminals 721a, 721b, and the DC/AC inverter 722 has input/output terminals 722a, 722b. The input/output terminal 721a of the DC/DC converter 721 is connected to the battery system group 711 in the power storage device 710. The input/output terminal 721b of the DC/DC converter 721 and the input/output terminal 722a of the DC/AC inverter 722 are connected to each other while being connected to an electric power outputter PU1. The input/output terminal 722b of the DC/AC inverter 722 is connected to an electric power outputter PU2 while being connected to another electric power system. Each of the electric power outputters PU1, PU2 has an outlet, for example. Various loads, for example, are connected to the electric power outputters PU1, PU2. The other electric power system includes a commercial power supply or a solar battery, for example. The electric power outputters PU1, PU2 and the other electric power system are examples of an external object connected to the power supply device.

The controller 712 controls the DC/DC converter 721 and the DC/AC inverter 722 so that the battery system group 711 is discharged and charged.

When the battery system group 711 is discharged, the DC/DC converter 721 performs DC/DC (direct current/direct current) conversion of electric power fed from the battery system group 711, and the DC/AC inverter 722 further performs DC/AC (direct current/alternating current) conversion thereof.

If the power supply device 700 is used as a DC power supply, electric power obtained by the DC/DC conversion in the DC/DC converter 721 is supplied to the electric power outputters PU1. If the power supply device 700 is used as an AC power supply, electric power obtained by the DC/AC conversion in the DC/AC inverter 722 is supplied to the electric power outputter PU2. AC electric power obtained by the conversion in the DC/AC inverter 722 can also be supplied to another electric power system.

When the battery system group 711 is discharged, the controller 712 determines whether the discharge of the battery system group 711 is stopped based on the calculated charged capacity, and controls the power conversion device 720 based on a determination result. More specifically, when the charged capacity of any one of the plurality of battery cells 10 (FIG. 2) included in the battery system group 711 becomes smaller than a predetermined threshold value, the controller 712 controls the DC/DC converter 721 and the DC/AC inverter 722 so that the discharge of the battery system group 711 is stopped. Thus, each of the battery cells 10 is prevented from being overdischarged.

On the other hand, when the battery system group 711 is charged, the DC/AC inverter 722 performs AC/DC (alternating current/direct current) conversion of AC electric power fed from another electric power system, and the DC/DC converter 721 further performs DC/DC (direct current/direct current) conversion thereof. Electric power is fed from the DC/DC converter 721 to the battery system group 711 so that the plurality of battery cells 10 (FIG. 2) included in the battery system group 711 are charged.

When the battery system group 711 is charged, the controller 712 determines whether the charge of the battery system group 711 is stopped based on the calculated charged capacity, and controls the power conversion device 720 based on a determination result. More specifically, when the charged capacity of any one of the plurality of battery cells 10 (FIG. 2) included in the battery system group 711 becomes larger than a predetermined threshold value, the controller 712 controls the DC/DC converter 721 and the DC/AC inverter 722 so that the charge of the battery system group 711 is stopped. Thus, each of the battery cells 10 is prevented from being overcharged.

If electric power can be supplied between the power supply device 700 and the external object, the power conversion device 720 may include only either one of the DC/DC converter 721 and the DC/AC inverter 722. If electric power can be supplied between the power supply device 700 and the external object, the power conversion device 720 need not be provided.

(9-2) Battery System

Figure 18:
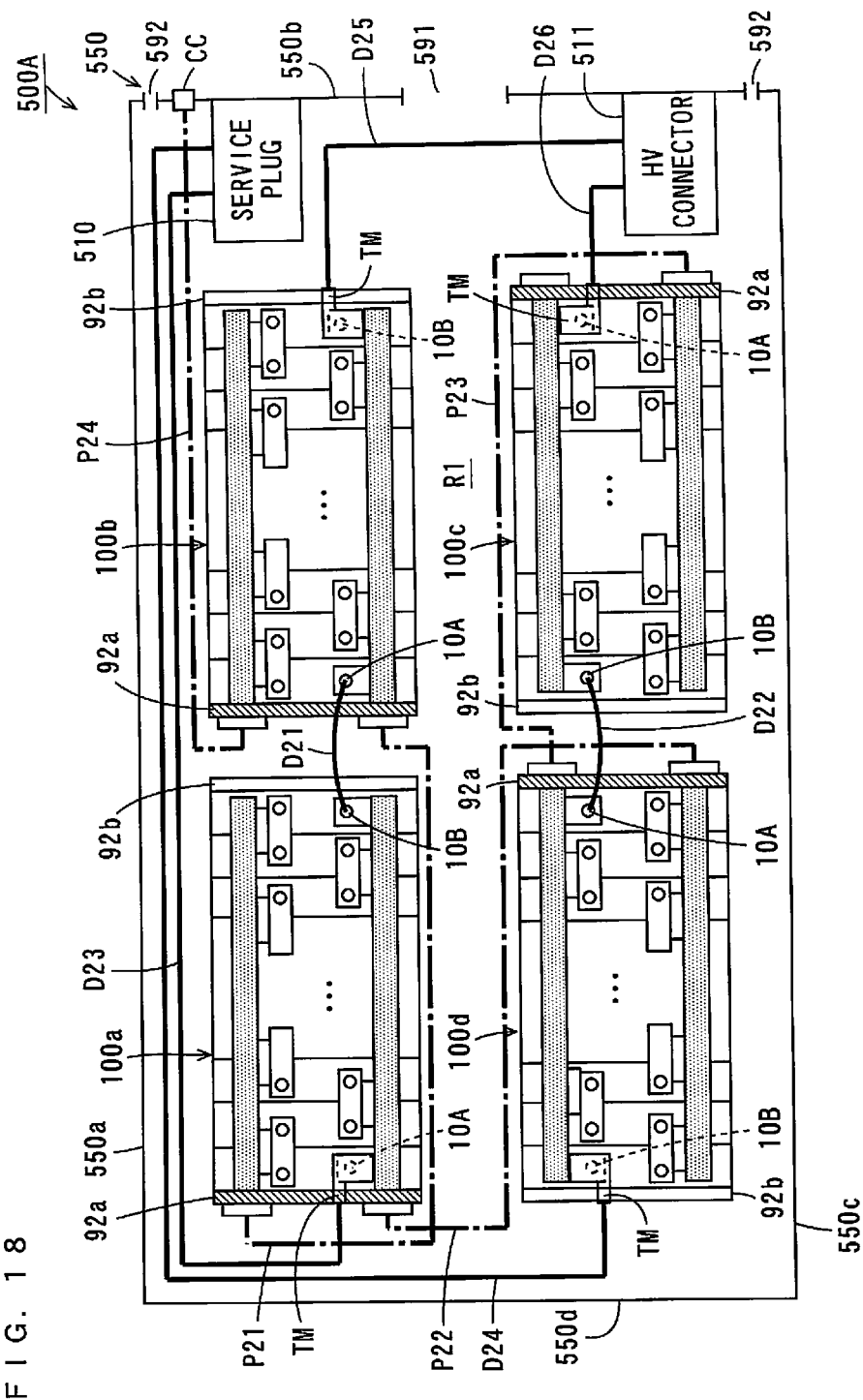
FIG. 18 is a schematic plan view illustrating a configuration of a battery system in a power supply device.

FIG. 18 is a schematic plan view illustrating a configuration of the battery system 500A in the power supply device 700. The battery system 500A illustrated in FIG. 18 will be described by referring to differences from the battery system 500 illustrated in FIG. 15.

In the battery system 500A illustrated in FIG. 18, a service plug 510 is provided in a side surface portion 550b in a housing 550 to be adjacent to the battery module 100b. An HV connector 511 is provided in the side surface portion 550b in the housing 550 to be adjacent to the battery module 100c. The battery ECU 101 and the contactor 102 are not provided.

In each of the battery modules 100a to 100d, a potential of the plus electrode 10a of the battery cell 10 adjacent to the end plate 92a is the highest, and a potential of the minus electrode 10b of the battery cell 10 adjacent to the end plate 92b is the lowest. The battery modules 100a, 100b are arranged to line up at a spacing, and the battery modules 100c, 100d are arranged to line up at a spacing.

The end plate 92a in the battery module 100a is directed toward a side surface portion 550d, and the end plate 92b in the battery module 100c is directed toward the side surface portion 550b. The end plate 92a in the battery module 100c is directed toward the side surface portion 550b, and the end plate 92b in the battery module 100d is directed toward the side surface portion 550d.

A low potential electrode 10B of the battery module 100a (a lowest-potential minus electrode 10b) and a high potential electrode 10A of the battery module 100b (a highest-potential plus electrode 10a) are connected to each other via an electric power line D21. A low potential electrode 10B of the battery module 100c and a high potential electrode 10A of the battery module 100d are connected to each other via an electric power line D22.

Figure 20:
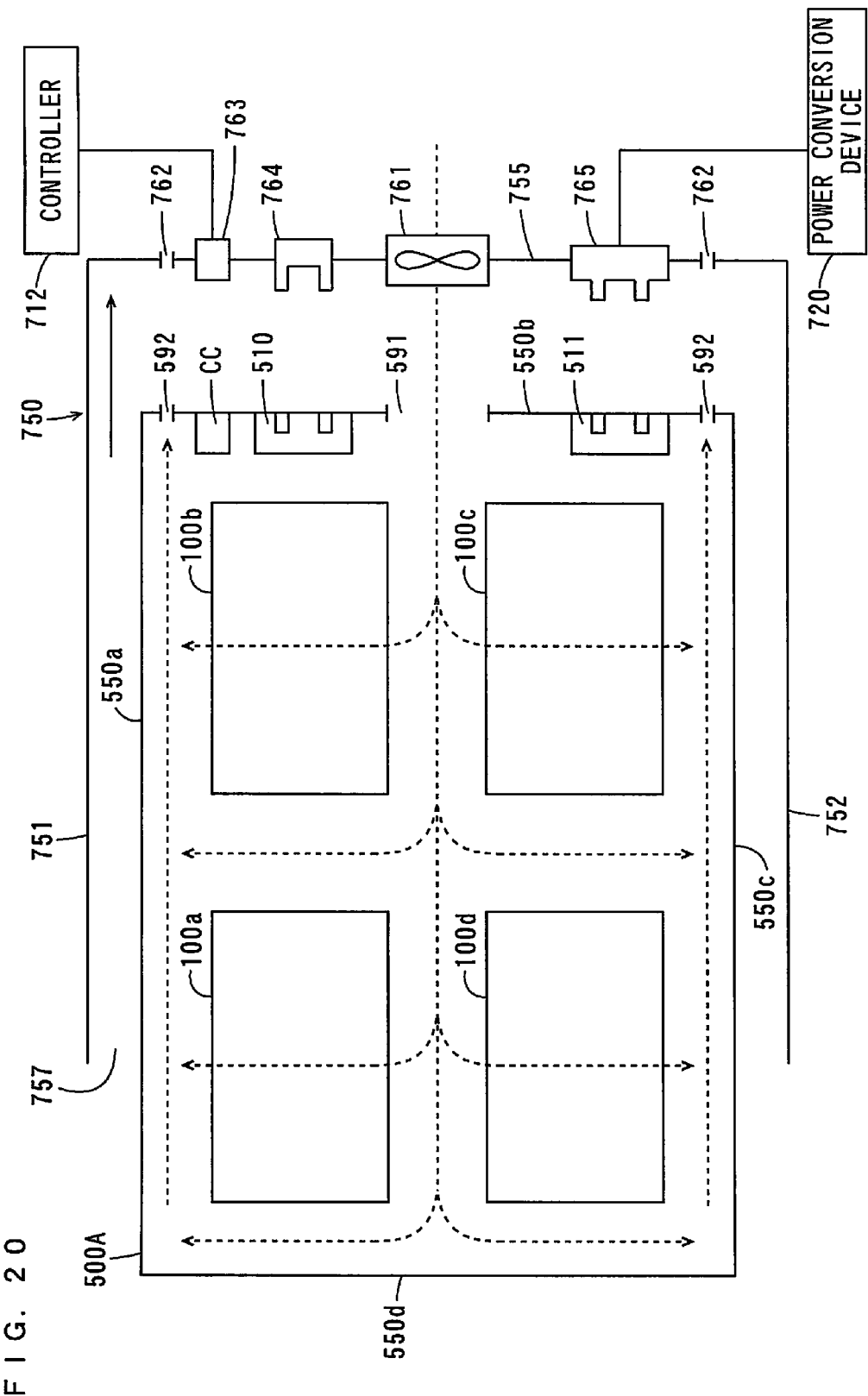
FIG. 20 is a schematic plan view illustrating a state where the battery system illustrated in FIG. 18 is housed in a housing space of the rack illustrated in FIG. 19.

A conductive relay member TM is attached to each of a high-potential electrode 10A of the battery module 100a, a low-potential electrode 10B of the battery module 100*b*, a high-potential electrode 10A of the battery module 100*c*, and a low-potential electrode 10B of the battery module 100*d*. The relay member TM attached to the high-potential electrode 10A of the battery module 100*a* is connected to the service plug 510 via an electric power line D23, and the relay member TM attached to the low-potential electrode 10B of the battery module 100*d* is connected to the service plug 510 via an electric power line D24. The service plug 510 is turned on by being connected to an ON/OFF switcher 764, described below (FIG. 20, described below). The service plug 510 is turned off in the state of being unconnected to the ON/OFF switcher 764.

The relay member TM attached to the low-potential electrode 10B of the battery module 100*b* is connected to the HV connector 511 via an electric power line D25, and the relay member TM attached to the high-potential electrode 10A of the battery module 100*c* is connected to the HV connector 511 via an electric power line D26.

The printed circuit board 21 (FIG. 2) in the battery module 100*a* and the printed circuit board 21 in the battery module 100*b* are connected to each other via a communication line P21. The printed circuit board 21 in the battery module 100*a* and the printed circuit board 21 in the battery module 100*d* are connected to each other via a communication line P22. The printed circuit board 21 in the battery module 100*c* and the printed circuit board 21 in the battery module 100*d* are connected to each other via a communication line P23.

A communication connector CC for connection with the controller 712 illustrated in FIG. 17 is provided in the side surface portion 550*b* in the housing 550. The printed circuit board 21 in the battery module 100*b* is connected to the communication connector CC via a communication line P24.

In the side surface portion 550*b* in the housing 550, a ventilation port 591 is formed on an extension of a ventilation path R1 between module rows T1, T2. Ventilation ports 592 are respectively formed at a position of the side surface portion 550*b* in close proximity to a side surface portion 550*a* and a position of the side surface portion 550*b* in close proximity to a side surface portion 550*c*. On the other hand, the cooling fin 581 and the exhaust port 582 are not formed in the side surface portion 550*d*.

(9-3) Installation of Battery System

Figure 19:
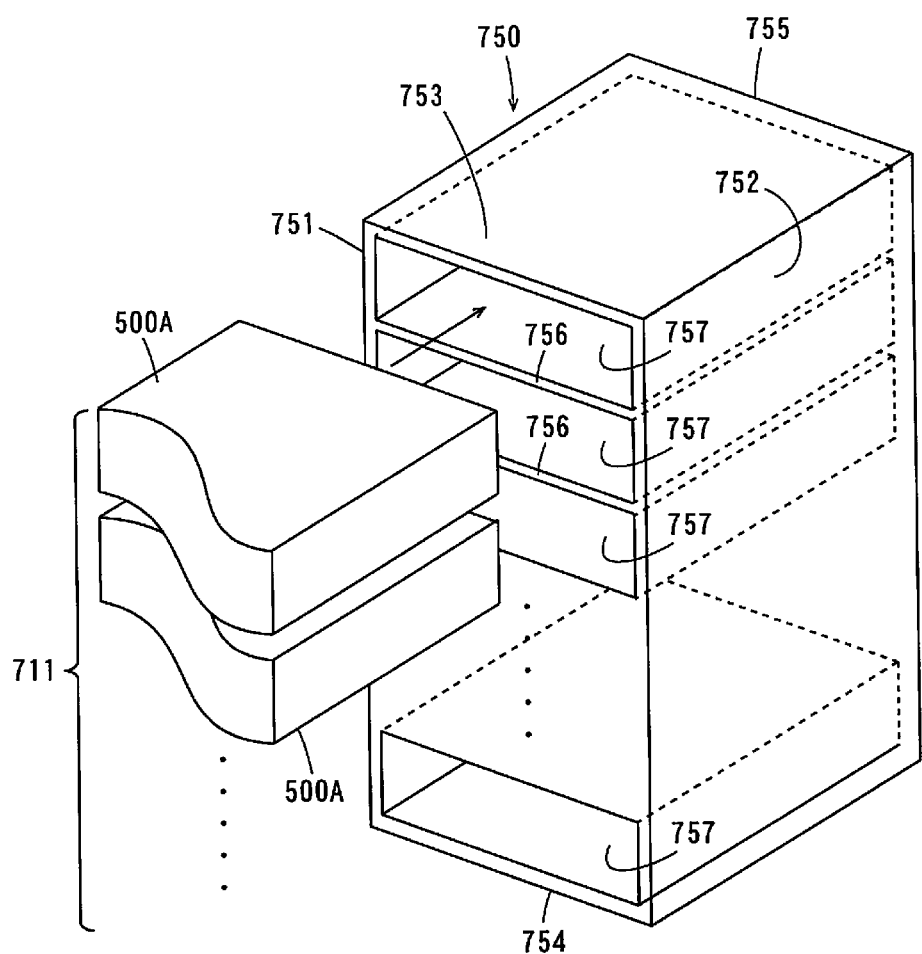
FIG. 19 is a perspective view of a rack that houses a plurality of battery systems.

In the present embodiment, the plurality of battery systems 500A illustrated in FIG. 18 are housed in a common rack. FIG. 19 is a perspective view of the rack that houses the plurality of battery systems 500A.

As illustrated in FIG. 19, a rack 750 includes side surface portions 751, 752, an upper surface portion 753, a bottom surface portion 754, a back surface portion 755, and a plurality of partition portions 756. The side surface portions 751, 752 vertically extend parallel to each other. The upper surface portion 753 horizontally extends to connect upper ends of the side surface portions 751, 752, and the bottom surface portion 754 horizontally extends to connect lower ends of the side surface portions 751, 752. The back surface portion 755 vertically extends perpendicularly to the side surface portions 751, 752 along one side of the side surface portion 751 and one side of the side surface portion 752. The plurality of partition portions 756 are equally spaced apart from one another parallel to the upper surface portion 753 and the bottom surface portion 754 between the upper surface portion 753 and the bottom surface portion 754.

A plurality of housing spaces 757 are provided among the upper surface portion 753, the plurality of partition portions 756, and the bottom surface portion 754. Each of the housing spaces 757 opens toward a front surface of the rack 750 (a surface opposite to the back surface portion 755). The battery system 500A illustrated in FIG. 18 is housed in each of the housing spaces 757 from the front surface of the rack 750.

FIG. 20 is a schematic plan view illustrating a state where the battery system 500A illustrated in FIG. 18 is housed in the housing space 757 in the rack 750 illustrated in FIG. 19. As illustrated in FIG. 20, the battery system 500A is housed in the housing space 757 in the rack 750 so that a side surface portion 550*b* in the battery system 500A is opposed to the back surface portion 755 in the rack 750.

In the back surface portion 755 in the rack 750, a cooling fin 761, two ventilation ports 762, a communication connector 763, an ON/OFF switcher 764, and an electric power connector 765 are provided for each of the housing spaces 757. The cooling fin 761 is provided at a position that overlaps a ventilation port 591 in the battery system 500A. The ventilation port 762 is provided at a position that overlaps a ventilation port 592 in the battery system 500A. The communication connector 763 is provided at a position that overlaps a communication connector CC in the battery system 500A. The ON/OFF switcher 764 is provided at a position that overlaps a service plug 510 in the battery system 500A. The power connector 765 is provided at a position that overlaps an HV connector 511 in the battery system 500A. The communication connector 763 is electrically connected to a controller 712. The power connector 765 is electrically connected to a power conversion device 720.

The battery system 500A is housed in the housing space 757 in the rack 750 so that the communication connector CC in the battery system 500A and the communication connector 763 in the rack 750 are connected to each other. As illustrated in FIG. 18, the printed circuit boards 21 on the end plates 92*a* in the battery modules 100*a* to 100*d* are connected to the communication connector CC via the communication lines P21 to P24. Therefore, the communication connector CC in the battery system 500A and the communication connector 763 in the rack 750 are connected to each other so that the printed circuit boards 21 in the battery modules 100*a* to 100*d* and the controller 712 are connected to each other to be communicatable.

The service plug 510 in the battery system 500A and the ON/OFF switcher 764 in the rack 750 are connected to each other. Thus, the service plug 510 is turned on. As a result, the battery modules 100*a* to 100*d* in the battery system 500 are connected in series.

Further, the HV connector 511 in the battery system 500A is connected to the power connector 765 in the rack 750. Thus, the HV connector 511 is connected to the power conversion device 720. As a result, electric power is supplied among the battery modules 100*a* to 100*d* in the battery system 500A.

Thus, the battery system 500A is housed in the housing space 757 in the rack 750 so that the service plug 510 is turned on while the HV connector 511 is connected to the power conversion device 720. On the other hand, with the battery system 500A not housed in the housing space 757 in the rack 750, the service plug 510 is turned off while the HV connector 511 is not connected to the power conversion device 720. Thus, with the battery system 500A not housed in the housing space 757 in the rack 750, a current path between the battery modules 100*a* to 100*d* is reliably blocked. Therefore, the battery system 500A can be subjected to maintenance work easily and safely.

With the battery system 500A housed in the housing space 757 in the rack 750, the cooling fin 761 introduces cooling gas into the housing 550 through the ventilation port 591. Thus, heat generated by each of the battery cells 10 (FIG. 2) in each of the battery modules 100*a* to 100*d* is absorbed by the cooling gas within the housing 550. The cooling gas that has absorbed heat within the housing 550 is emitted through the ventilation ports 592 in the housing 550 and the ventilation ports 762 in the rack 750. Thus, the battery cell 10 in each of the battery modules 100a to 100d is cooled.

In this case, the rack 750 is provided with the cooling fin 761 so that a cooling fin need not be provided for each of the battery systems 500A. Thus, the cost of the battery system 500A is reduced. If cooling gas can be introduced into the housing 550 in each of the battery systems 500A, the battery system 500A may be provided with a cooling fin.

The cooling fin 761 may cause the cooling gas within the housing 550 to be emitted through the ventilation port 591. In this case, the cooling gas, which has been introduced into the housing 550 through the ventilation ports 762, 592, absorbs heat within the housing 550, and is then emitted through the ventilation port 591. A ventilation port may be provided in each of side surface portions 550a, 550c in the housing 550 and side surface portions 751, 752 in the rack in the battery system 500A. In this case, the emission of the cooling gas from inside the housing 550 and the introduction of the cooling gas into the housing 550 can be more efficiently performed.

While all the battery systems 500A are housed in one rack 750 in this example, all the battery systems 500A may be separately housed in a plurality of racks 750. The battery systems 500A may be individually installed to be connected to the controller 712 and the power conversion device 720.

(9-4) Effects

In the power supply device 700 according to the present embodiment, the controller 712 controls the supply of electric power between the battery system group 711 and the external object. Thus, each of the battery cells 10 included in the battery system group 711 is prevented from being overdischarged and overcharged.

In each of the battery systems 711A, the separator S1 (FIG. 5) forms a gap SE (FIG. 7) between one surface of each of the battery cells 10 and the other adjacent battery cell 10. Cooling gas is supplied to the gap SE so that each of the battery cells 10 is efficiently cooled. A spacing between the other surface of each of the battery cells 10 and the other adjacent battery cell 10 is kept smaller than a spacing between the one surface of each of the battery cells 10 and the other adjacent battery cell 10. Therefore, the battery modules 100a to 100d are miniaturized. As a result, the power supply device 700 can be miniaturized.

(9-5) Another Example of Battery System

Figure 21:
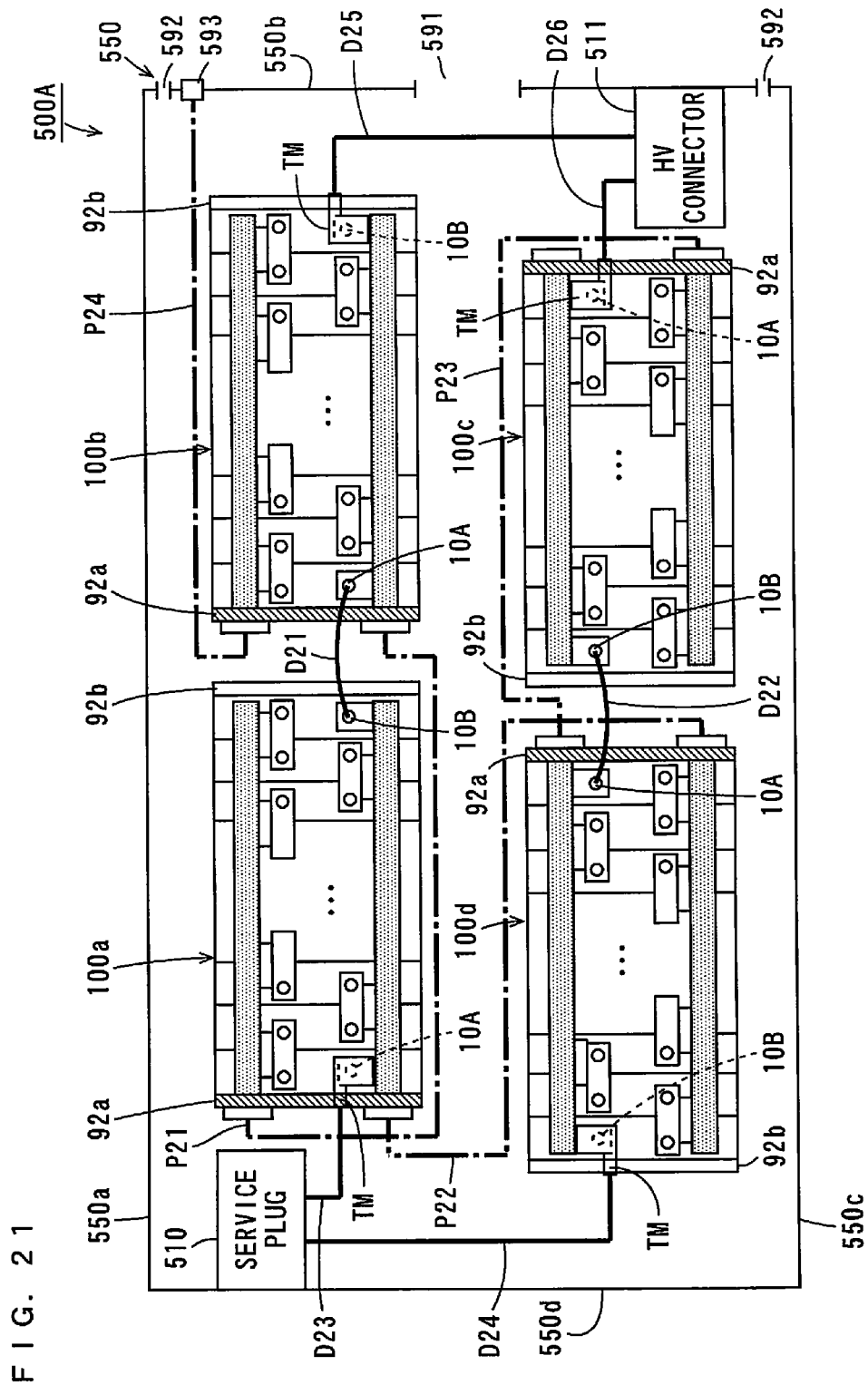
FIG. 21 is a schematic plan view illustrating another example of a battery system.

FIG. 21 is a schematic plan view illustrating another example of the battery system 500A. The example illustrated in FIG. 21 will be described by referring to differences from the example illustrated in FIG. 18.

In the example illustrated in FIG. 21, a service plug 510 is provided in a side surface portion 550d to be adjacent to a battery module 100a. The side surface portion 550d is exposed to a front surface of the rack 750 illustrated in FIG. 19 with the battery system 500A housed in the rack 750. Therefore, a user can switch ON/OFF of the service plug 510 from the front surface of the rack 750 with the battery system 500A housed in the rack 750. As a result, the battery system 500A can be easily maintained.

(10) Correspondences between Constituent Elements in the Claims and Parts in Embodiments In the following paragraph, non-limiting examples of correspondences between various elements recited in the claims below and those described above with respect to various embodiments of the present invention are explained.

In the embodiments, described above, the separator S1 is an example of a separator, d1 is an example of a first value, the separator S2 is an example of a second separator, d2 is an example of a second value, the bus bars 40, 40b, 40c, 40d, 40e are examples of a connection member, the electrode connection holes 43, 431 to 434 are examples of first and second holes, the X-direction is an example of a stacked direction of a plurality of battery cells, the electric automobile 600 is an example of an electric vehicle and a movable body, the vehicle body 610 is an example of a main movable body, the motor 602 is an example of a power source, and the controller 712 is an example of a controller.

As each of various elements recited in the claims, various other elements having configurations or functions described in the claims can also be used.

[Industrial Applicability]

The present invention is applicable to various movable bodies using electric power as a driving source, a power storage device, or a mobile device.

The invention claimed is:

1. A battery module comprising:
   a plurality of three or more battery cells that are stacked at spacings; and
   a plurality of separators that are each arranged between adjacent battery cells of the three of more battery cells and that each keep the spacing between the adjacent battery cells,
   wherein the plurality of separators include:
      a plurality of first separators each having a plated-shaped portion of a cross-sectional shape bent in a concavo-convex shape, and
      a plurality of second separators each having a flat plate-shaped portion,
      each of the battery cells is arranged between the plated-shaped portion of the cross-sectional shape bent in the concavo-convex shape and the flat plate-shaped portion, and abuts on the plated-shaped portion of the cross-sectional shape bent in the concavo-convex shape and the flat plate-shaped portion, and
   the plurality of first separators and the plurality of second separators are arranged to keep one of the odd-numbered spacing and the even-numbered spacing from one end side of the plurality of battery cells larger than the other spacing, the first separators and the second separators being arranged alternately.

2. The battery module according to claim 1, wherein the plurality of first separators each form a gap through which cooling gas can pass between the adjacent battery cells.

3. The battery module according to claim 2, wherein the plurality of first separators have lower thermal insulation properties than the plurality of second separators.

4. The battery module according to claim 1, further comprising
   a connection member that electrically connects electrodes of the adjacent battery cells,
   wherein the connection member includes first and second holes into which the electrodes of the adjacent battery cells are respectively inserted, at least one of the first and second holes being provided to extend in a stacked direction of the plurality of battery cells.

5. The battery module according to claim 1, further comprising
   a connection member that electrically connects the electrodes of the adjacent battery cells,
   wherein the connection member includes first and second holes into which the electrodes of the adjacent battery cells are respectively inserted, and the position of the electrode of each of the battery cells is set so that distances between the electrodes of the adjacent battery cells are equal.

6. An electric vehicle comprising:
the battery module according to claim 1;
a motor that is driven with electric power from the battery module; and
a drive wheel that rotates with a torque generated by the motor.

7. A movable body comprising:
the battery module according to claim 1;
a main movable body; and
a power source that receives electric power from the battery module, and converts the electric power into drive power for moving the main movable body.

8. A battery system comprising the plurality of battery modules according to claim 1.

9. A power storage device comprising:
the battery system according to claim 8; and
a controller that performs at least one of determination whether discharge of the plurality of battery modules is stopped at the time of the discharge of the plurality of battery modules and determination whether charge of the plurality of battery modules is stopped at the time of the charge of the plurality of battery modules based on charged capacities of the plurality of battery modules in the battery system.

10. A power supply device that is connectable to an external object, comprising:
the power storage device according to claim 9; and
a power conversion device that converts electric power between the plurality of battery modules in the power storage device and the external object,
wherein the controller controls the supply of electric power between the power conversion device and the external object based on a result of the determination whether the discharge or charge of the plurality of battery modules is stopped.

11. The battery module according to claim 1, wherein the first separators are configured to have higher strength than the second separators.

* * * * *